US012263535B2

(12) United States Patent
Neufeld et al.

(10) Patent No.: US 12,263,535 B2
(45) Date of Patent: Apr. 1, 2025

(54) FRAME AND EXTERIOR SHROUDING FOR LASER PROCESSING SYSTEM

(71) Applicant: ELECTRO SCIENTIFIC INDUSTRIES, INC., Portland, OR (US)

(72) Inventors: Corie Neufeld, Portland, OR (US); Jeremy Willey, Portland, OR (US); Brandon Bilyeu, Apo (DE); Wayne Crowther, Portland, OR (US); Chris Ryder, Portland, OR (US)

(73) Assignee: ELECTRO SCIENTIFIC INDUSTRIES, INC., Beaverton, OR (US)

( * ) Notice: Subject to any disclaimer, the term of this patent is extended or adjusted under 35 U.S.C. 154(b) by 639 days.

(21) Appl. No.: 17/272,611

(22) PCT Filed: Oct. 15, 2019

(86) PCT No.: PCT/US2019/056216
§ 371 (c)(1),
(2) Date: Mar. 1, 2021

(87) PCT Pub. No.: WO2020/081500
PCT Pub. Date: Apr. 23, 2020

(65) Prior Publication Data
US 2021/0346985 A1 Nov. 11, 2021

Related U.S. Application Data

(60) Provisional application No. 62/788,216, filed on Jan. 4, 2019, provisional application No. 62/746,364, filed on Oct. 16, 2018.

(51) Int. Cl.
*B23K 26/12* (2014.01)
*B23K 26/08* (2014.01)
(Continued)

(52) U.S. Cl.
CPC ......... *B23K 26/127* (2013.01); *B23K 26/142* (2015.10); *B23K 26/702* (2015.10); *B23K 37/006* (2013.01); *B23K 26/08* (2013.01)

(58) Field of Classification Search
CPC .. B23K 26/127; B23K 26/142; B23K 26/702; B23K 37/006; B23K 26/08;
(Continued)

(56) References Cited

U.S. PATENT DOCUMENTS 4,680,442 A * 7/1987 Bauer ................. B23K 26/147
219/121.72
5,402,734 A * 4/1995 Galpin ................. B08B 15/007
428/116

(Continued)

FOREIGN PATENT DOCUMENTS

CN 201012431 Y 1/2008
CN 201799776 U * 4/2011
(Continued)

OTHER PUBLICATIONS

KR 101778088 B1 english translation (Year: 2017).*
(Continued)

*Primary Examiner* — Eric S Stapleton
(74) *Attorney, Agent, or Firm* — Edward Scott Trask; Kurt M. Eaton

(57) ABSTRACT

A frame for a laser processing module can be characterized as including a platform having an upper surface and a lower surface, an optics bridge spaced apart from, and extending over, the upper surface of the platform and a bridge support interposed between, and coupled to, the platform and the optics bridge. At least one selected from the group consisting of the platform and the optics bridge includes a sandwich panel. The sandwich panel can include a first plate, a second plate and a core interposed between the first plate and the (Continued)

second plate. The first plate and the second plate can be indirectly attached to one another by the core and the core can define at least one channel extending between the first plate and the second plate. The sandwich panel can also include a first port formed at an exterior of the sandwich panel and in fluid communication with the at least one channel, and a second port formed at the exterior of the sandwich panel and in fluid communication with the at least one channel.

25 Claims, 14 Drawing Sheets

(51) Int. Cl.
  *B23K 26/142* (2014.01)
  *B23K 26/70* (2014.01)
  *B23K 37/00* (2006.01)
  *B23K 37/006* (2025.01)

(58) Field of Classification Search
  CPC ............ B23K 37/0461; B23K 26/0853; B23K 37/02; G01M 11/04; B08B 15/02; B08B 2215/006
  USPC ..................................................... 219/121.6
  See application file for complete search history.

(56) References Cited

U.S. PATENT DOCUMENTS

| | | | |
|---|---|---|---|
| 5,600,538 A * | 2/1997 | Xanthopoulos ......... | G06F 1/181 361/679.6 |
| 5,626,157 A | 5/1997 | John et al. | |
| 5,854,460 A | 12/1998 | Graf et al. | |
| 5,962,104 A * | 10/1999 | Gertel ....................... | B32B 3/12 428/116 |
| 6,031,199 A * | 2/2000 | Ream ..................... | B23K 26/38 219/121.64 |
| 6,157,450 A * | 12/2000 | Marchese-Ragona ...................... | G01B 11/306 356/602 |
| 6,227,515 B1 * | 5/2001 | Broyles .................... | G02B 7/00 248/346.02 |
| 7,495,848 B2 * | 2/2009 | Hall ........................ | G01M 11/04 359/811 |
| 8,082,061 B2 | 12/2011 | Segal et al. | |
| 8,231,098 B2 * | 7/2012 | Ryaboy .................... | B60N 2/54 248/550 |
| 9,702,619 B2 | 7/2017 | Kendall et al. | |
| 9,797,558 B2 | 10/2017 | Kerr et al. | |
| 10,507,545 B2 * | 12/2019 | Brehm ................. | B23K 26/127 |
| 2004/0134392 A1 * | 7/2004 | Sargeant ................ | G01M 11/04 428/116 |
| 2005/0061778 A1 * | 3/2005 | Arakawa ............ | B23K 26/1436 219/121.6 |
| 2005/0205778 A1 | 9/2005 | Kitai et al. | |
| 2005/0257573 A1 | 11/2005 | Henssler et al. | |
| 2006/0076322 A1 * | 4/2006 | Brauchle ............. | B23K 26/706 219/121.6 |
| 2007/0144409 A1 * | 6/2007 | Zhu .......................... | G02B 7/00 428/116 |
| 2008/0102963 A1 | 5/2008 | Flagg et al. | |
| 2010/0089880 A1 * | 4/2010 | Sercel .................. | B23K 9/1087 219/121.67 |
| 2010/0167076 A1 * | 7/2010 | Nishida ................ | B23K 26/402 264/400 |
| 2011/0084050 A1 * | 4/2011 | Togashi ............. | B23K 26/0853 219/121.75 |
| 2013/0032583 A1 | 2/2013 | Epperlein et al. | |
| 2013/0104780 A1 * | 5/2013 | Zhu .......................... | B25H 1/08 108/28 |
| 2015/0176763 A1 * | 6/2015 | Bunz ......................... | F16P 3/02 219/121.86 |
| 2015/0252604 A1 * | 9/2015 | Inaguchi ............. | E05D 15/0656 49/409 |
| 2015/0273387 A1 * | 10/2015 | Hayashi ................ | B23K 26/147 96/7 |
| 2015/0273633 A1 * | 10/2015 | Masauji ............. | B23Q 11/0891 219/121.67 |
| 2017/0087682 A1 * | 3/2017 | Leonhard .................. | F16M 1/00 |
| 2017/0165788 A1 * | 6/2017 | Maruyama ........... | B23K 26/127 |
| 2018/0141050 A1 * | 5/2018 | Ryan ........................ | B01L 9/02 |
| 2018/0313422 A1 * | 11/2018 | Ryan ...................... | G01M 11/04 |
| 2018/0361522 A1 * | 12/2018 | Fornasero ............... | B23Q 1/64 |
| 2018/0369957 A1 * | 12/2018 | Kosmowski ....... | B23K 26/0869 |
| 2021/0276125 A1 * | 9/2021 | Lu ........................ | B23K 26/082 |

FOREIGN PATENT DOCUMENTS

| | | | | |
|---|---|---|---|---|
| CN | 104223358 A | * | 12/2014 | ............... A24C 5/14 |
| CN | 204522064 U | | 8/2015 | |
| CN | 105562925 A | * | 5/2016 | |
| CN | 106216854 A | * | 12/2016 | |
| CN | 107030380 A | * | 8/2017 | |
| CN | 107584208 A | | 1/2018 | |
| CN | 107671440 A | * | 2/2018 | ........... B23K 26/702 |
| CN | 108279584 A | * | 7/2018 | ........... B32Q 17/249 |
| CN | 108296637 A | * | 7/2018 | ............. B23K 26/21 |
| CN | 207642496 U | * | 7/2018 | |
| CN | 108356432 A | * | 8/2018 | |
| CN | 108515271 A | | 9/2018 | |
| CN | 107052590 B | * | 10/2018 | ......... B23K 26/0876 |
| CN | 108655593 A | * | 10/2018 | |
| EP | 0596600 A1 | * | 5/1994 | |
| EP | 3130456 A2 | * | 2/2017 | ............. B32B 27/04 |
| GB | 2175199 A | * | 11/1986 | ............. A47B 13/08 |
| JP | 198321889 A | | 12/1983 | |
| JP | 1985114431 A | | 6/1985 | |
| JP | S6154536 B2 | * | 11/1986 | |
| JP | 1997117836 A | | 5/1997 | |
| JP | H09117836 A | * | 5/1997 | |
| JP | 2011155167 A | | 8/2011 | |
| JP | 2011255472 A | * | 12/2011 | |
| KR | 101778088 B1 | * | 9/2017 | |
| KR | 1020160096328 B1 | | 9/2017 | |
| WO | WO97/07903 A1 | | 3/1997 | |
| WO | WO-2013178281 A1 | * | 12/2013 | ............... A62C 2/12 |
| WO | WO-2017132369 A1 | * | 8/2017 | ........... B23K 26/042 |

OTHER PUBLICATIONS

CN 201799776 U english translation (Year: 2011).*
CN 107030380 A english translation (Year: 2017).*
Roland DWX-4W User's Manual, 2015 (Year: 2015).*
JP-S6154536-B2 English translation (Year: 1986) (Year: 1986).*
CN-201799776-U English translation (Year: 2011) (Year: 2011).*
Roland DWX-4W User's Manual, 2015 (Year: 2015) (Year: 2015).*
KR-101778088-B1 English translation (Year: 2017) (Year: 2017).*
CN-105562925-A English translation (Year: 2016).*
PCT/US2019/056216, international search report issued Feb. 11, 2020, 4 pages.
PCT/US2019/056216, written opinion, 8 pages.
Office Action report for Chinese counterpart application No. 201980057738.2 mailed Mar. 1, 2023. (13 pages).
Office Action report for Chinese counterpart application No. 2019-80057738.2 mailed Jul. 14, 2022 (19 pages).
Written opinion issued Dec. 29, 2021 to Singapore patent application No. 11202101856S, 103 pages.
Office Action issued for JP counterpart application No. 2021-520929 dated Jun. 20, 2023 (3 pages).
Search Report for Taiwanese counterpart application No. 108137233 completed on Sep. 12, 2023. (2 pages).
Office Action issued for KR counterpart application No. 10-2021-7014764 dated Jul. 29, 2024 (6 pages).

* cited by examiner

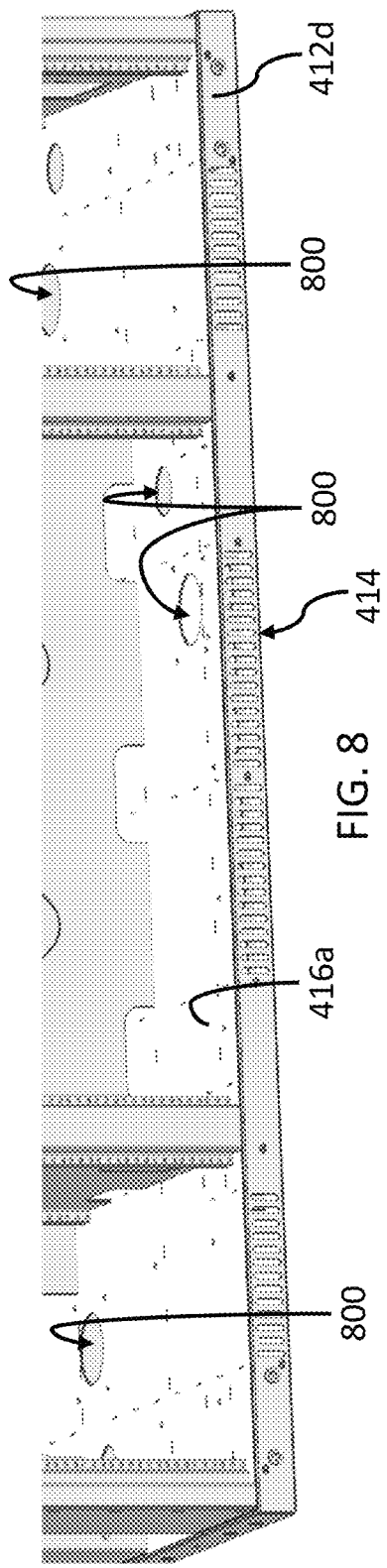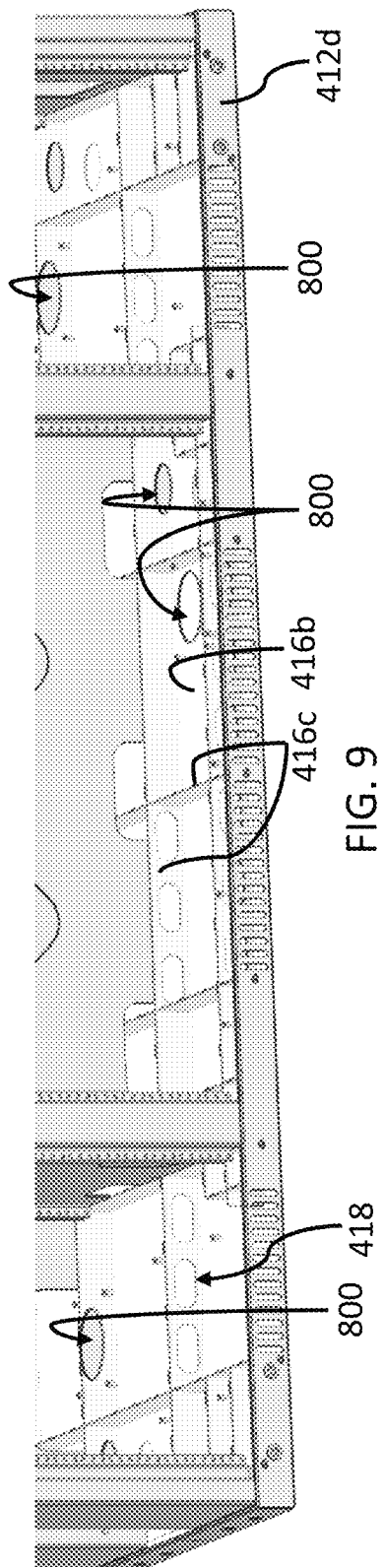

FRAME AND EXTERIOR SHROUDING FOR LASER PROCESSING SYSTEM

CROSS-REFERENCE TO RELATED APPLICATIONS

This application claims the benefit of U.S. Provisional Application No. 62/788,216, filed Jan. 4, 2019 and U.S. Provisional Application No. 62/746,364, filed Oct. 16, 2018, each of which is incorporated herein by reference in its entirety.

BACKGROUND

I. Technical Field

Embodiments of the present invention relate to frames, shrouds, signaling, and related aspects, for use in processing systems such as laser processing systems.

II. Discussion of the Related Art

Laser processing systems use various gasses to control and influence innumerable aspects of processing. It is common to use them to hold substrates, collect debris, move parts, remove heat, stabilize temperature etc. The routing and use of these gasses can pose various problems and challenges. Using standard pipes, tubes and hoses is often cumbersome, cluttered and difficult. Bulk airflow passing over structural elements can have a limited impact on process and structural stability. It is with a recognition of these and other limitations of conventional that the example embodiments described in the disclosure below were developed.

SUMMARY

One embodiment described herein can be characterized as a frame for a laser processing module can be characterized as including a platform having an upper surface and a lower surface, an optics bridge spaced apart from, and extending over, the upper surface of the platform and a bridge support interposed between, and coupled to, the platform and the optics bridge. At least one selected from the group consisting of the platform and the optics bridge includes a sandwich panel. The sandwich panel can include a first plate, a second plate and a core interposed between the first plate and the second plate. The first plate and the second plate can be indirectly attached to one another by the core and the core can define at least one channel extending between the first plate and the second plate. The sandwich panel can also include a first port formed at an exterior of the sandwich panel and in fluid communication with the at least one channel, and a second port formed at the exterior of the sandwich panel and in fluid communication with the at least one channel.

Another embodiment described herein can be characterized as a laser processing module for processing a workpiece, wherein the module include a frame (e.g., as described above or elsewhere herein) and a laser source supported by the optics bridge of the frame. In this case, the workpiece can be supported on the platform of the frame.

Yet another embodiment described herein can be characterized as a laser processing module that includes a system frame and a laser source supported by the system frame. In this case, the system frame can include at least one sandwich panel including two plates indirectly attached to each other by a core interposed between the plates Still another embodiment described herein can be characterized as a laser processing module that includes a carbon dioxide laser operative to generate a laser beam having an average power of 200 W or greater, and a frame. In this case, the laser can be supported by the frame and the frame does not include any material selected from the group consisting of granite, diabase, and concrete.

Yet another embodiment described herein can be characterized as a laser processing module that includes a carbon dioxide laser operative to generate a laser beam having an average power of 200 W or greater, and a frame. In this case, the laser is supported by the frame and the frame is supported on an exterior surface by no more than three support pads.

Another embodiment described herein can be characterized as a laser processing module that includes a frame, a chuck supported by the frame and configured to support a workpiece within a process bay, a laser operative to generate a laser beam configured to process the workpiece, a visual signaling system including at least one light emitting element operative to emit light (e.g., wherein the visual signaling system is operative to illuminate at least one object exposed to the process bay with the light), and a controller communicatively coupled to the visual signaling system. In this case, the controller is operative to control the visual signaling system to change at least one characteristic of the light depending upon at least one selected from the group consisting of a functional status of the laser processing module, the type of workpiece to be processed within the laser processing module, a pattern of features to be formed in or on the workpiece during processing, a status of a production run, a throughput of the laser processing module, a cycle time during processing of a workpiece and a takt time.

BRIEF DESCRIPTION OF THE DRAWINGS

FIG. 8 is an enlarged rear perspective view of the electronics exhaust system, as shown in FIG. 5, according to one embodiment.

FIG. 9 is an enlarged rear perspective view of the electronics exhaust system, as shown in FIG. 16, in which a view of an exterior plate is omitted to reveal stiffeners therein, according to one embodiment.

In FIG. 17, the purge connection tube is highlighted to show its configuration within the system frame.

DETAILED DESCRIPTION

Figure 1:
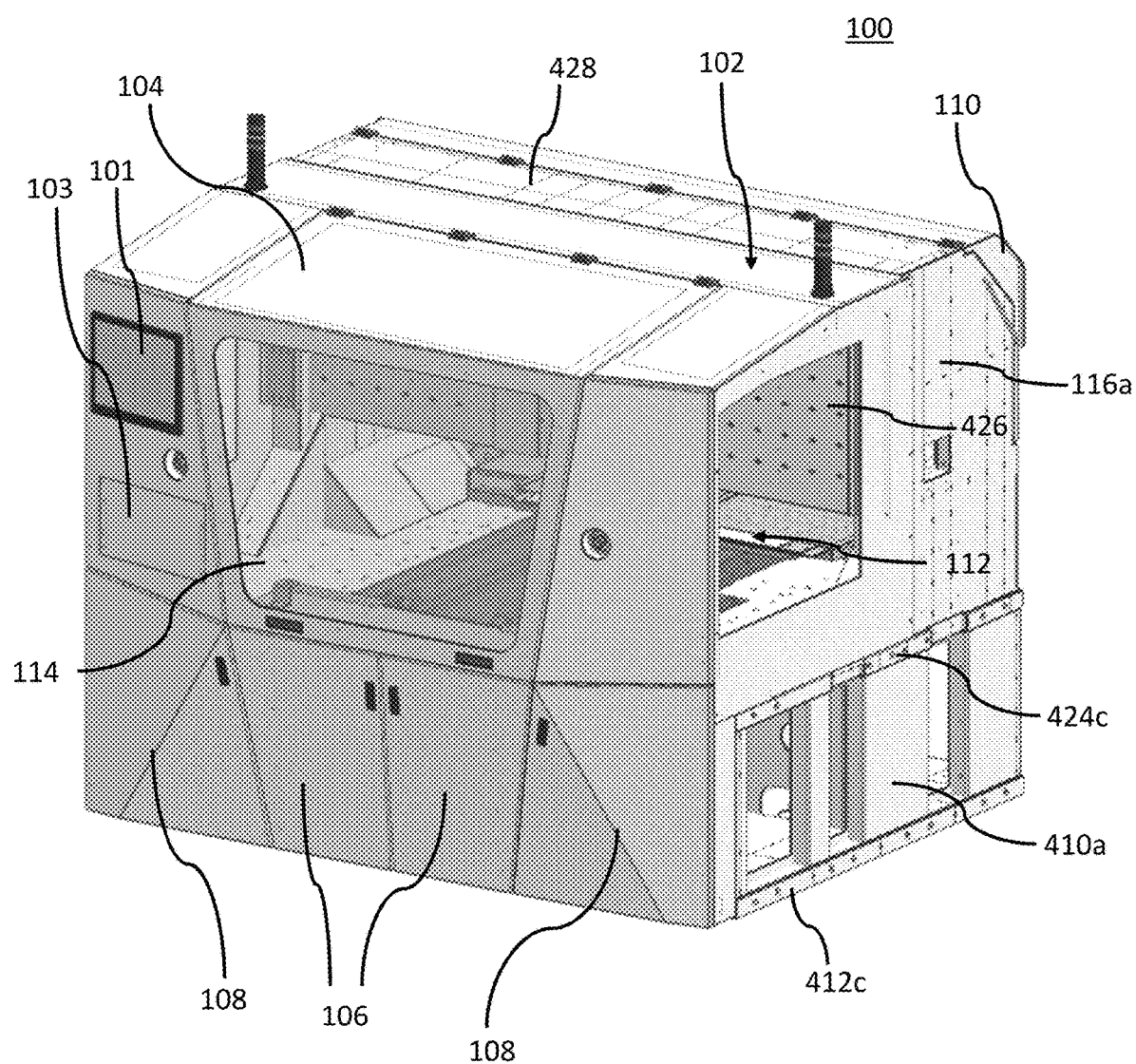
FIG. 1 is a front perspective view of a laser processing module according to an embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," "approximately," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. OVERVIEW

Embodiments described herein relate generally to a frame, exterior shrouding, visual status indicators, and components thereof, for a laser processing system operative to machine, alter or otherwise process a workpiece. Generally a workpiece can be processed, either in whole or in part, by irradiating the workpiece with a beam of laser energy to heat, melt, evaporate, ablate, crack, discolor, polish, roughen, carbonize, foam, or otherwise modify one or more properties or characteristics (e.g., in terms of chemical composition, atomic structure, ionic structure, molecular structure, electronic structure, microstructure, nanostructure, density, viscosity, index of refraction, magnetic permeability, relative permittivity, texture, color, hardness, transmissivity to electromagnetic radiation, or the like or any combination thereof) of one or more materials from which the workpiece is formed. Processing may thus occur at an exterior of the workpiece or be completely within workpiece.

Specific examples of processes that may be carried out by the disclosed apparatus for laser processing include via drilling or other hole formation, cutting, perforating, welding, scribing, engraving, marking (e.g., surface marking, sub-surface marking, etc.), laser-induced forward transfer, cleaning, bleaching, bright pixel repair (e.g., color filter darkening, modification of OLED material, etc.), decoating, surface texturing (e.g., roughening, smoothing, etc.), or the like or any combination thereof. Thus, one or more features on that may be formed on or within a workpiece, as a result of the processing, can include openings, slots, vias or other holes, grooves, trenches, scribe lines, kerfs, recessed regions, conductive traces, ohmic contacts, resist patterns, human- or machine-readable indicia (e.g., comprised of one or more regions in or on the workpiece having one or more visually or texturally distinguishing characteristics), or the like or any combination thereof. Features such as openings, slots, vias, holes, etc., can have any suitable or desirable shape (e.g., circular, elliptical, square, rectangular, triangular, annular, or the like or any combination thereof) when viewed from a top plan view. Further, features such as openings, slots, vias, holes, etc., can extend completely through the workpiece (e.g., so as to form so-called "through vias," "through holes," etc.) or only partially through the workpiece (e.g., so as to form so-called "blind vias," "blind holes," etc.).

Workpieces that may be processed can be generically characterized being formed of one or more metals, polymers, ceramics, composites, or any combination thereof (e.g., whether as an alloy, compound, mixture, solution, composite, etc.). Accordingly, materials that may be processed include one or more metals such as Al, Ag, Au, Cr, Cu, Fe, In, Mg, Mo, Ni, Pt, Sn, Ti, or the like, or any combination thereof (e.g., whether as an alloy, composite, etc.), conductive metal oxides (e.g., ITO, etc.), transparent conductive polymers, ceramics, waxes, resins, interlayer dielectric materials (e.g., silicon dioxide, silicon nitride, silicon oxynitride, etc., low-k dielectric materials such as methyl silsesquioxane (MSQ), hydrogen silsesquioxane (HSQ), fluorinated tetraethyl orthosilicate (FTEOS), or the like or any combination thereof), organic dielectric materials (e.g., SILK, benzocyclobutene, Nautilus, (all manufactured by Dow), polyfluorotetraethylene, (manufactured by DuPont), FLARE, (manufactured by Allied Chemical), etc., or the like or any combination thereof), semiconductor or optical device substrate materials (e.g., $Al_2O_3$, AlN, BeO, Cu, GaAS, GaN, Ge, InP, Si, SiO2, SiC, Si1−xGex (where 0.0001<x<0.9999), or the like, or any combination or alloy thereof), glass (e.g., fused quartz, soda-lime-silica glass, sodium borosilicate glass, lead oxide glass, aluminosilicate glass, germanium oxide glass, aluminate glass, phosphate glass, borate glass, chalcogenide glass, amorphous metal, or the like or any combination thereof), sapphire, polymeric materials (e.g., polyamide, polyimide, polyester, polyethylene naphthalate (PEN), polyethylene terephthalate (PET), polyacetal, polycarbonate, modified polyphenylene ether, polybutylene terephthalate, polyphenylene sulfide, polyether sulfone, polyether imide, polyether ether ketone, liquid crystal polymer, acrylonitrile butadiene styrene, or any compound, composite or alloy thereof), leather, paper, build-up materials (e.g., AJINOMOTO Build-up Film, also known as "ABF", etc.), solder resist, or the like or any composite, laminate, or other combination thereof.

Specific examples of workpieces that may be processed include, panels of printed circuit boards (PCBs) (also referred to herein as "PCB panels"), PCBs, PCB laminates (e.g., FR4, High Tg Epoxy, BT, polyimide, or the like or any combination thereof), PCB laminate prepregs, substrate-like PCBs (SLPs), panels of flexible printed circuits (FPCs) (also referred to herein as "FPC panels"), FPCs, laminates for FPCs (also referred to as "FPC laminates"), coverlay films, integrated circuits (ICs), IC substrates, IC packages (ICPs), light-emitting diodes (LEDs), LED packages, semiconductor wafers, electronic or optical device substrates, interposers, lead frames, lead frame blanks, display substrates (e.g., substrates having TFTs, color filters, organic LED (OLED) arrays, quantum dot (QD) LED arrays, or the like or any combination thereof, formed thereon), lenses, mirrors, turbine blades, powders, films, foils, plates, molds (e.g., wax molds, molds for injection-molding processes, investment-casting processes, etc.), fabrics (woven, felted, etc.), surgical instruments, medical implants, consumer packaged goods, shoes, bicycles, automobiles, automotive or aerospace parts (e.g., frames, body panels, etc.), appliances (e.g., microwaves, ovens, refrigerators, etc.), device housings (e.g., for watches, computers, smartphones, tablet computers, wearable electronic devices, or the like or any combination thereof).

Generally, the laser processing system will include a laser source operative to generate a beam of laser energy and at least one positioner. The laser processing system also typically includes one or more optical components (e.g., harmonic generation crystals, beam expanders, beam shapers, apertures, filters, collimators, lenses, mirrors, polarizers, wave plates, diffractive optical elements, refractive optical elements, optical shutters, prisms, pulse gating or picking devices, the like or any combination thereof) that are to be used to focus, expand, collimate, shape, perform wavelength conversion, polarize, filter, split, combine, crop, or otherwise modify, condition, direct, etc., the beam of laser energy generated by the laser source before it is delivered to the workpiece. The laser processing system can also include one or more other devices which support the operations of the laser source, the at least one positioner, and the like. Examples of such other devices include controllers, computers, chillers, fans, sensors, vacuums, etc.

The beam of laser energy output by the laser source can have one or more wavelengths in the ultraviolet (UV), visible or infrared (IR) range of the electromagnetic spectrum. Laser light in the UV range of the electromagnetic spectrum may have one or more wavelengths in a range from 10 nm (or thereabout) to 385 nm (or thereabout), such as 100 nm, 121 nm, 124 nm, 157 nm, 200 nm, 334 nm, 337 nm, 351 nm, 380 nm, etc., or between any of these values. Laser light in the visible, green range of the electromagnetic spectrum may have one or more wavelengths in a range from 500 nm (or thereabout) to 560 nm (or thereabout), such as 511 nm, 515 nm, 530 nm, 532 nm, 543 nm, 568 nm, etc., or between any of these values. Laser light in the IR range of the electromagnetic spectrum may have one or more wavelengths in a range from 750 nm (or thereabout) to 15 µm (or thereabout), such as 600 nm to 1000 nm, 752.5 nm, 780 nm to 1060 nm, 799.3 nm, 980 nm, 1047 nm, 1053 nm, 1060 nm, 1064 nm, 1080 nm, 1090 nm, 1152 nm, 1150 nm to 1350 nm, 1540 nm, 2.6 µm to 4 µm, 4.8 µm to 8.3 µm, 9.4 µm, 10.6 µm, etc., or between any of these values.

The beam of laser energy output by the laser source can, optionally, be manifested as a series of laser pulses having a pulse width (i.e., based on the full-width at half-maximum (FWHM) of the optical power in the pulse versus time) that is in a range from 10 fs to 900 ms. It will be appreciated, however, that the pulse duration can be made smaller than 10 fs or larger than 900 ms. Thus, at least one laser pulse output by the laser source can have a pulse duration less than, greater than or equal to 10 fs, 15 fs, 30 fs, 50 fs, 100 fs, 150 fs, 200 fs, 300 fs, 500 fs, 600 fs, 750 fs, 800 fs, 850 fs, 900 fs, 950 fs, 1 ps, 2 ps, 3 ps, 4 ps, 5 ps, 7 ps, 10 ps, 15 ps, 25 ps, 50 ps, 75 ps, 100 ps, 200 ps, 500 ps, 1 ns, 1.5 ns, 2 ns, 5 ns, 10 ns, 20 ns, 50 ns, 100 ns, 200 ns, 400 ns, 800 ns, 1000 ns, 2 µs, 5 µs, 10 µs, 15 µs, 20 µs, 25 µs, 30 µs, 40 µs, 50 µs, 100 µs, 300 µs, 500 µs, 900 µs, 1 ms, 2 ms, 5 ms, 10 ms, 20 ms, 50 ms, 100 ms, 300 ms, 500 ms, 900 ms, 1 s, etc., or between any of these values.

The beam of laser energy output by the laser source can have an average power in a range from 5 mW to 50 kW. It will be appreciated, however, that the average power can be made smaller than 5 mW or larger than 50 kW. Thus, the beam of laser energy output by the laser source can have an average power less than, greater than or equal to 5 mW, 10 mW, 15 mW, 20 mW, 25 mW, 50 mW, 75 mW, 100 mW, 300 mW, 500 mW, 800 mW, 1 W, 2 W, 3 W, 4 W, 5 W, 6 W, 7

W, 10 W, 15 W, 18 W, 25 W, 30 W, 50 W, 60 W, 100 W, 150 W, 200 W, 250 W, 500 W, 2 kW, 3 kW, 20 kW, 50 kW, etc., or between any of these values.

When manifested as a series of laser pulses, the beam of laser energy can be output by the laser source at a pulse repetition rate in a range from 5 kHz to 5 GHz. It will be appreciated, however, that the pulse repetition rate can be less than 5 kHz or larger than 5 GHz. Thus, laser pulses can be output by the laser source at a pulse repetition rate less than, greater than or equal to 5 kHz, 50 kHz, 100 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 60 MHz, 100 MHz, 150 MHz, 200 MHz, 250 MHz, 300 MHz, 350 MHz, 500 MHz, 550 MHz, 600 MHz, 900 MHz, 2 GHz, 10 GHz, etc., or between any of these values.

In addition to wavelength, pulse duration, average power and pulse repetition rate, laser pulses delivered to the workpiece can be characterized by one or more other characteristics such as pulse energy, peak power, etc., which can be selected (e.g., optionally based on one or more other characteristics such as wavelength, pulse duration, average power and pulse repetition rate, etc.) to irradiate the workpiece at the process spot at an optical intensity (measured in W/cm$^2$), fluence (measured in J/cm$^2$), etc., sufficient to process the workpiece (e.g., to form one or more features having one or more desired characteristics).

Examples of types of lasers that the laser source may be characterized as gas lasers (e.g., carbon dioxide lasers, carbon monoxide lasers, excimer lasers, etc.), solid-state lasers (e.g., Nd:YAG lasers, etc.), rod lasers, fiber lasers, photonic crystal rod/fiber lasers, passively mode-locked solid-state bulk or fiber lasers, dye lasers, mode-locked diode lasers, pulsed lasers (e.g., ms-, ns-, ps-, fs-pulsed lasers), CW lasers, QCW lasers, or the like or any combination thereof. Depending upon their configuration, gas lasers (e.g., carbon monoxide layers, carbon dioxide lasers, etc.) may be configured to operate in one or more modes (e.g., in CW mode, QCW mode, pulsed mode, or any combination thereof). Specific examples of laser sources that may be provided as the laser source include one or more laser sources such as: the BOREAS, HEGOA, SIROCCO or CHINOOK series of lasers manufactured by EOLITE; the PYROFLEX series of lasers manufactured by PYROPHOTONICS; the PALADIN Advanced 355, DIAMOND series (e.g., DIAMOND E, G, J-2, J-3, J-5 series), the FLARE NX, MATRIX QS DPSS, MEPHISTO Q, AVIA LX, AVIA NX, RAPID NX, HYPERRAPID NX, RAPID, HELIOS, FIDELITY, MONACO, OPERA, or RAPID FX series of lasers manufactured by COHERENT; the PALADIN Advanced 355, DIAMOND series (e.g., DIAMOND E, G, J-2, J-3, J-5 series), the ASCEND, EXCELSIOR, EXPLORER, HIPPO, NAVIGATOR, QUATA-RAY, QUASAR, SPIRIT, TALON, or VGEN series of lasers manufactured by SPECTRA PHYSICS; the PULSTAR- or FIRESTAR-series lasers manufactured by SYNRAD; the TRUFLOW-series of lasers (e.g., TRUFLOW 2000, 2600, 3000, 3200, 3600, 4000, 5000, 6000, 6000, 8000, 10000, 12000, 15000, 20000), TRUCOAX series of lasers (e.g., TRUCOAX 1000) or the TRUDISK, TRUPULSE, TRUDIODE, TRUFIBER, or TRUMICRO series of lasers, all manufactured by TRUMPF; the FCPA µJEWEL or FEMTOLITE series of lasers manufactured by IMRA AMERICA; the TANGERINE and SATSUMA series lasers (and MIKAN and T-PULSE series oscillators) manufactured by AMPLITUDE SYSTEMES; CL, CLPF, CLPN, CLPNT, CLT, ELM, ELPF, ELPN, ELPP, ELR, ELS, FLPN, FLPNT, FLT, GLPF, GLPN, GLR, HLPN, HLPP, RFL, TLM, TLPN, TLR, ULPN, ULR, VLM, VLPN, YLM, YLPF, YLPN, YLPP, YLR, YLS, FLPM, FLPMT, DLM, BLM, or DLR series of lasers manufactured by IPG PHOTONICS (e.g., including the GPLN-100-M, GPLN-500-QCW, GPLN-500-M, GPLN-500-R, GPLN-2000-S, etc.), or the like or any combination thereof.

The at least one positioner is operative to move the beam of laser energy relative to the workpiece (in which case the at least one positioner is provided as one or more galvanometer mirrors, polygon scanning mirrors, fast-steering mirrors, acousto-optic deflectors, electro-optic deflectors, or the like or any combination thereof), to move the workpiece relative to the beam of laser energy (in which case the at least one positioner is provided as one or more linear motion stages, rotational motion stages, or the like or any combination thereof), or any combination thereof.

Insofar as any of the laser source, optical components or positioner affects the ability of the laser processing system to accurately and reliably deliver a beam of laser energy to a particular location (or to within a range of a particular location) on or within the workpiece, such objects components are generically referred to herein as "process components."

As discussed in greater detail below, the laser processing system includes a system frame for supporting the laser source, the at least one positioner, as well as any of the aforementioned optical components or other devices. The laser processing system may also include one or more shrouds to minimize or prevent particulate matter (whether generated during processing of a workpiece or present in the environment external to the laser processing system) from accumulating on optical surfaces of the laser source and optical components. The one or more shrouds can also help to prevent or minimize the diffusion of particulate matter generated during processing of the workpiece, which can be potentially hazardous to human health, into the external environment surrounding the laser processing system.

II. EMBODIMENTS RELATING TO THE EXTERIOR SHROUDS

Figure 2:
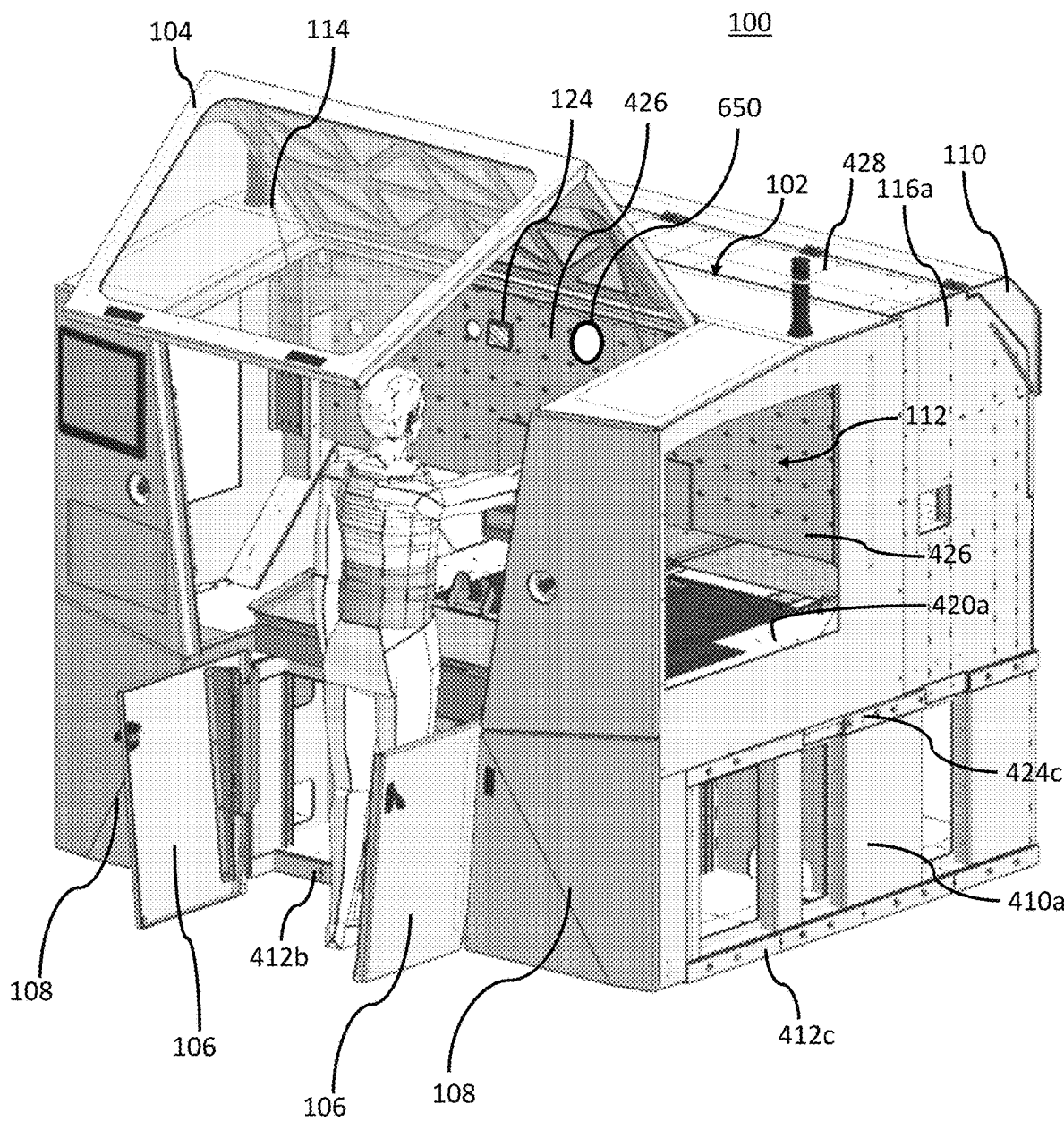
FIGS. 2 and 3 are front perspective and side elevation views, respectively, of the laser processing module shown in FIG. 1, in which certain shrouds have been engaged to permit a user access to an interior of the laser processing module.
Figure 3:
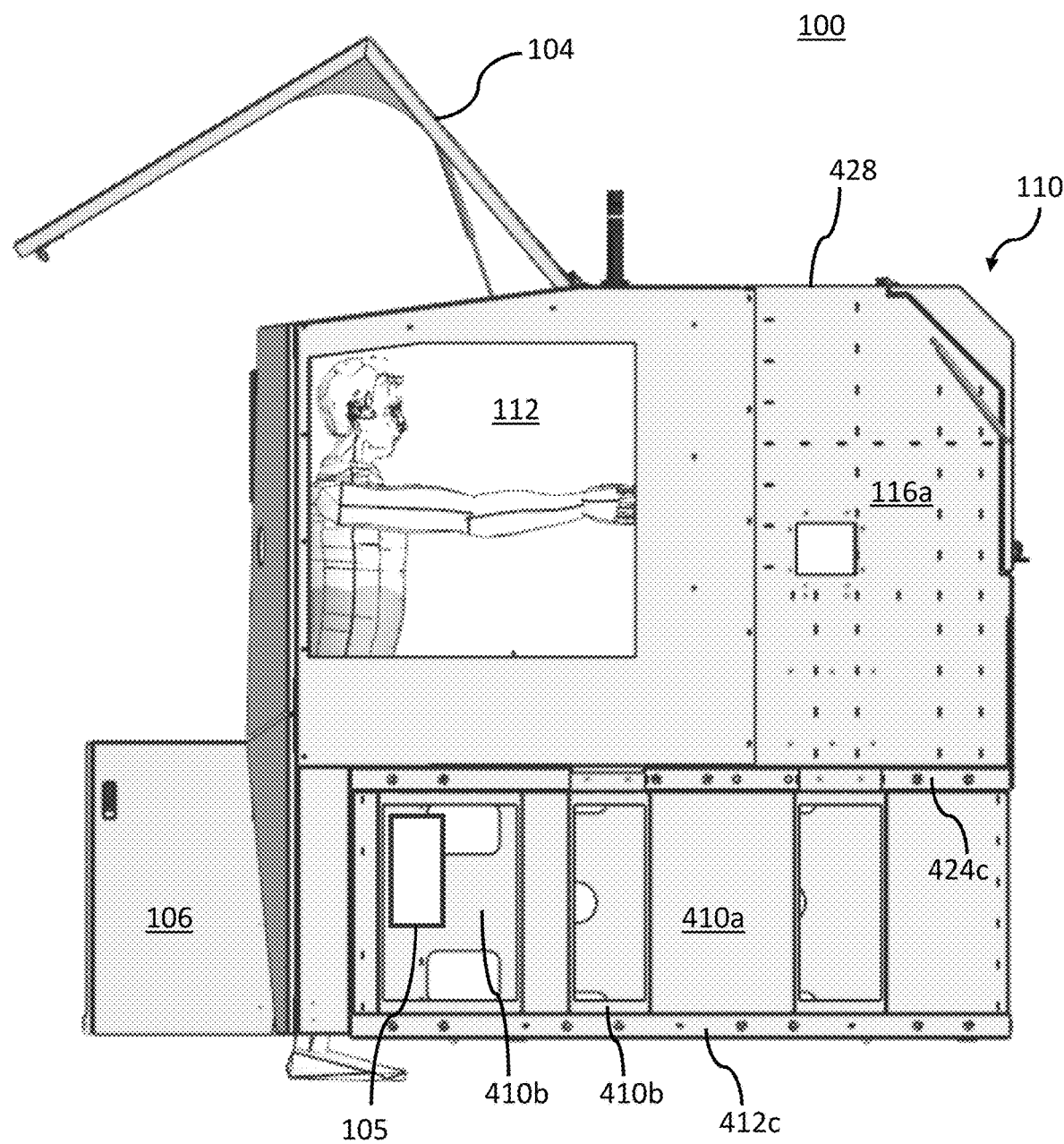

Referring generally to FIGS. 1 to 3, the aforementioned laser processing system may include a laser processing module, such as laser processing module 100. Although not shown, the laser processing module 100 may include a laser source 120 (e.g., as discussed above and shown in FIG. 5), at least one positioner 120 (e.g., as discussed above), one or more optical components 124 (e.g., as discussed above), and one or more other devices (e.g., as discussed above). The laser processing module 100 includes a system frame (portions of which are shown in FIGS. 1 and 3, but which is shown more clearly and completely in FIGS. 4 to 6) for supporting the laser source 120, the at least one positioner 122, as well as any of the aforementioned optical components or other devices. The laser processing module 100 also includes a plurality of exterior shrouds, which define (e.g., at least structurally) the exterior appearance of the laser processing module 100. The exterior shrouds may be attached to the system frame, to one another, or any combination thereof.

The exterior shrouds may include a process bay shroud 102 attached to the system frame, a first door shroud 104 attached to the first shroud 102, a plurality of second door shrouds 106 attached to the system frame, a plurality of third door shrouds 108 attached to the system frame, and an optics bay door shroud 110 attached to the system frame. One or more user-interface components may be integrated into the any of the exterior shrouds. For example, a user-interface component such as a computer monitor 101 (e.g., a display screen, a touch screen, etc.) may be integrated into the first shroud 102 to display information to a user. The first shroud 102 may also include a bay 103 for presenting a user-interface component such as a keyboard, trackpad, computer mouse, microphone or other device so that a user can input information (e.g., for controlling one or more operations supported by the laser processing module 100, or the laser processing system more generally). User-interface components may communicatively connected to one or more other devices (e.g., one or more controllers, computers, etc.) which support the operations of the laser source, the at least one positioner, or any other device (e.g., one or more chillers, fans, sensors, vacuums, or the like).

Generally, the process bay shroud 102 encloses a space (also referred to herein as a "process bay") partially defined by the system frame where a workpiece 405 can be supported during processing. Accordingly, when the workpiece 405 is processed, laser energy will be present within the process bay. In the illustrated embodiment, the process bay shroud 102 includes one or more ports (e.g., port 112) formed at a side surface thereof, through which the workpiece 405 can be loaded into the laser processing module 100 (e.g., from a loader module, not shown, attached to the laser processing module 100) or unloaded from the laser processing module 100 (e.g., to a unloader module, not shown, attached to the laser processing module 100). In this case, the loader module and unloader module can be considered as parts of the laser processing system. In another embodiment, however, the process bay shroud 102 does not include any of such ports, so, extends to the system frame on all sides of the space where the workpiece 405 can be supported during processing.

The first door shroud 104 is attached to the process bay shroud 102 so as to be rotatable, e.g., from the state shown in FIG. 1 to the state shown in FIGS. 2 and 3. Optionally, the first door shroud 104 may include a window 114 (e.g., allowing a person to view the process bay). The window 114 may be provided so as to filter or otherwise block transmission of light at the wavelength of the beam of laser energy, as is known in the art. The plurality of second door shrouds 106 are attached to the system frame so as to be rotatable, e.g., from the state shown in FIG. 1 to the state shown in FIGS. 2 and 3.

When the first door shroud 104 and the plurality of second door shrouds 106 are in their "opened" state (e.g., as shown in FIGS. 2 and 3), a person (e.g., an operator, engineer, or the like) can access the process bay. Upon accessing the process bay, the person can clean, remove, replace, install, align, etc., one or more objects arranged within the process bay. Examples of objects that can be arranged within the process bay include the workpiece, a scan lens, a galvanometer mirror, a vacuum debris capture nozzle, the chuck, a motion stage, and the like. As will be discussed in greater detail below, the system frame can be recessed so as to allow a person to step into the process bay (e.g., as shown in FIGS. 2 and 3) when the first door shroud 104 and the plurality of second door shrouds 106 are in their "opened" state. Thus, the system frame allows a person to easily access the process bay so that the person can clean, remove, replace, install, align, etc., one or more objects arranged therein.

The plurality of third door shrouds 108 may be attached to the system frame so as to be rotatable, e.g., from the state shown in FIG. 1 to an "opened" state, similar to the state of any of the plurality second door shrouds 106 as shown in FIGS. 2 and 3. When any third door shroud 108 is in its opened state, a person (e.g., an operator, engineer, or the like) can access an electronics bay within the system frame. Upon accessing the process bay, the person can clean, remove, replace, install, align, etc., one or more objects arranged within the electronics bay. Examples of objects that can be arranged within the electronics bay include one or more controllers, computers, pumps, chillers, fans, and the like.

Generally, the optics bay door shroud 110 encloses a space (also referred to herein as an "optics bay") partially defined by the system frame where a laser source 120 and any of the aforementioned optical components be housed. The optics bay door shroud 110 is attached to the system frame so as to be rotatable, e.g., from the state shown in FIG. 1 to an "opened" state similar to the opened state of the first door shroud 104 shown in FIGS. 2 and 3. When the optics bay door shroud 110 is in its opened state, a person (e.g., an operator, engineer, or the like) can access the optics bay. Upon accessing the process bay, the person can clean, remove, replace, install, align, etc., the laser source 120, one or more optical components 124, any other objects arranged within the optics bay.

III. EMBODIMENTS RELATING TO THE SYSTEM FRAME

Generally, the system frame can be characterized as including a plurality of sandwich panels coupled to one another so as to support or otherwise house the laser source, the at least one positioner, as well as any of the aforementioned optical components or other devices as discussed above. As used herein, a "sandwich panel" refers to a structure that includes a pair of relatively thin, strong and stiff plates that are indirectly attached to each other by a core interposed between the plates. In one embodiment, the plates are formed of a material such as sheet metal (e.g., which may be formed of steel). The core is generally provided as one or more plates, tubes, or the like (each of which is generically referred to herein as a "stiffener") or any combination thereof, which are attached to the plates. Generally, the dimensions and mechanical properties (e.g., which may include one or more of the modulus of elasticity, tensile strength, elongation, hardness and fatigue limit), number and arrangement of the stiffeners in the core are selected to ensure that the plates of the sandwich panel can maintain their relative positions during loading (e.g., during mechanical loading, thermal loading, etc.) of the sandwich panel. In one embodiment, the plates and stiffeners are formed of a material such as sheet metal (e.g., which may be formed of steel), and each plate may be attached to the stiffeners (e.g., by welding, via an adhesive, or the like or any combination thereof). In one embodiment, each stiffener may be formed as a plate, which may be perforated or non-perforated.

When properly designed, the sandwich panels of the system frame can help to at least partially isolate the process components from external vibrations (i.e., vibrations present in the environment surrounding the laser processing system) and internal vibrations (i.e., vibrations generated within the laser processing module 100, e.g., during operation of the at least one positioner, etc.) without requiring the use of high-mass bases, gantries or other supports that are conventionally formed as blocks of granite, diabase, concrete, steel, wood or the like. Further, when properly designed, the sandwich panels of the system frame can help to support the laser source, the at least one positioner, as well as any of the aforementioned optical components or other devices without requiring the use of a tubular beam frame structure.

Further, as discussed in greater detail below, internal channels can be formed within the system frame to serve one or more functions such as optics bay purging, debris extraction, heat extraction, thermal loading stabilization, vacuum chuck activation, hose and cable routing, or the like or any combination thereof.

Figure 4:
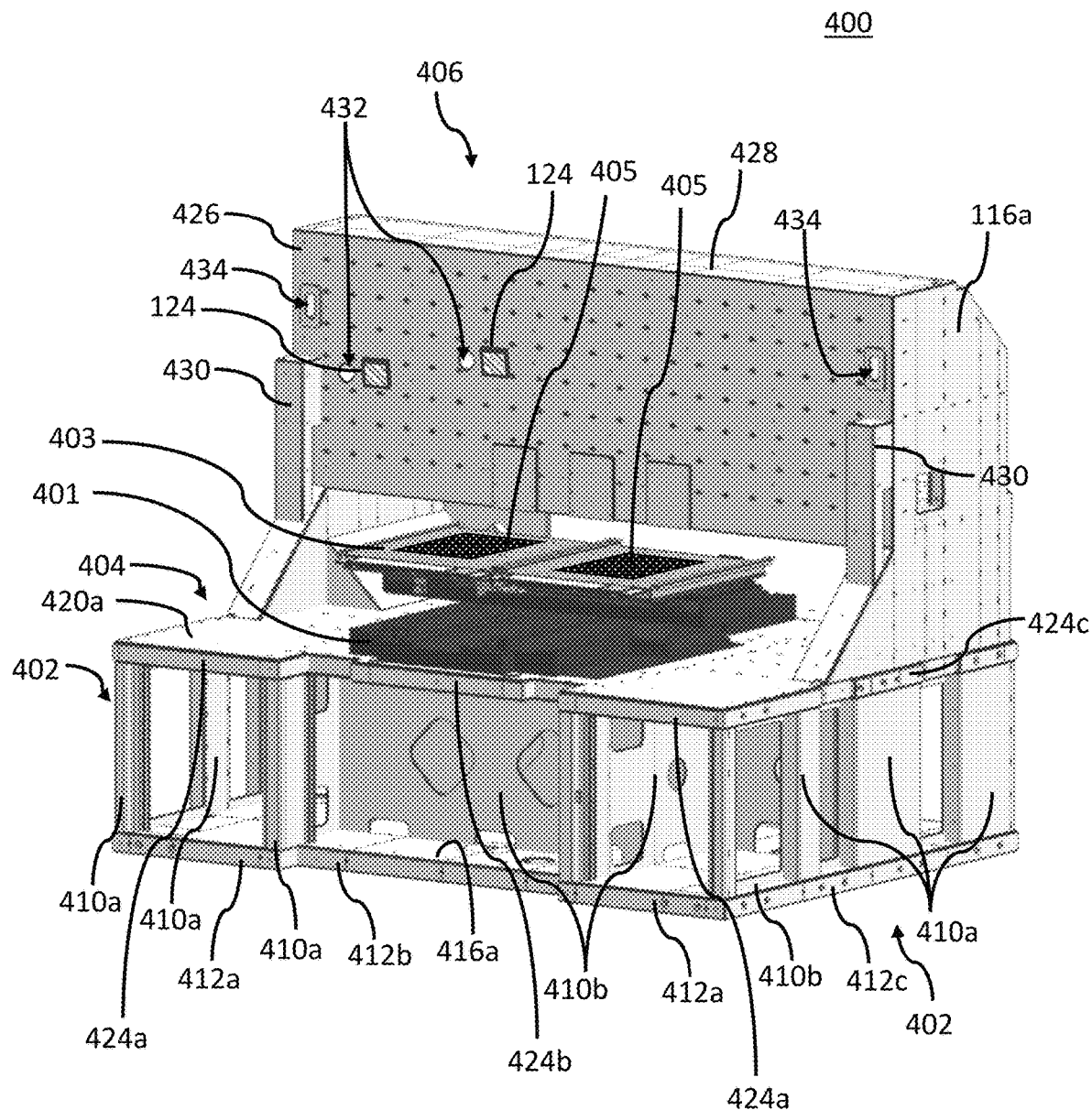
FIGS. 4 and 5 are front and rear perspective views, respectively, of a system frame in the laser processing module shown in FIG. 1, according to an embodiment.
Figure 5:
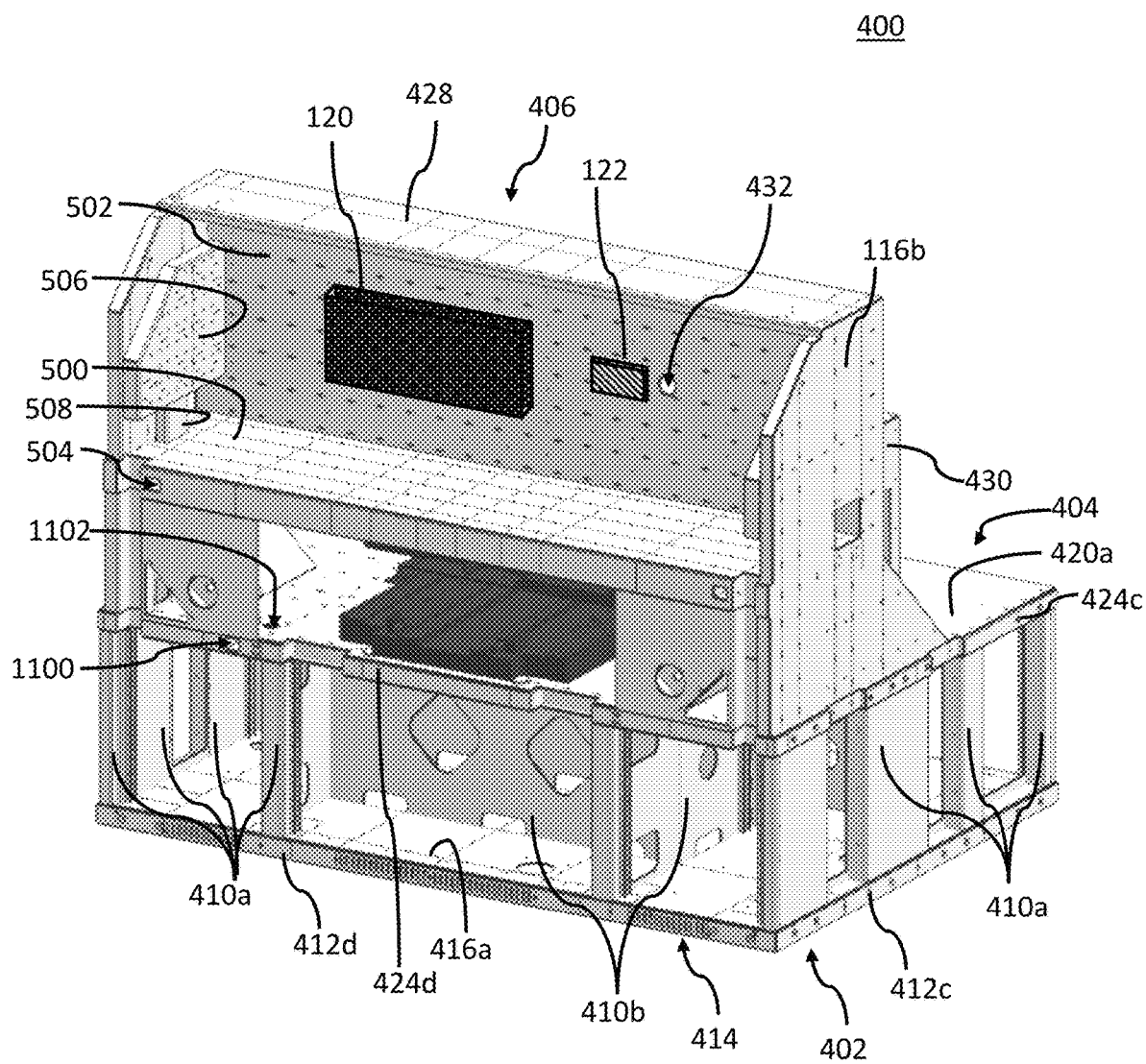

As exemplarily shown in FIGS. 4 and 5, the system frame can, in one embodiment, be provided as system frame 400 that includes a base 402, a platform 404 and an optics bridge 406. The base 402 supports the platform 404 which, in turn, supports the optics bridge 406. Also shown in FIGS. 4 and 5 is a motion stage 401 mounted to the platform 404, and a chuck 403 mounted to the motion stage 401. Although not illustrated, the optics bridge may support or house one or more objects such as the laser source 120, any of the aforementioned optical components, any of the aforementioned positioners 122 operative to move the beam of laser energy relative to the workpiece 405, a vacuum debris capture nozzle, or the like of any combination thereof.

In the illustrated embodiment, the motion stage 401 is a so-called "stacked" motion stage (i.e., an assembly of motion stages in which one motion stage is mounted onto, and carried by, another motion stage). The motion stage 401 is configured to linearly move the chuck 403 along two axes of motion (e.g., within a plane parallel to an upper surface of the platform 404). In other embodiments, however, the motion stage 401 can be configured to linearly move the chuck 403 along a single axis of motion or to move the chuck (e.g., linearly, rotationally, or any combination thereof) along more than two axes of motion. The chuck 403 may be provided as a vacuum chuck, an electrostatic chuck, a mechanical chuck, a magnetic chuck, or the like or any combination thereof.

A. Embodiments Relating to the Base

Referring to, for example, FIGS. 4 to 9, the base 402 includes a foundation panel 408, and a plurality base supports 410a and a plurality of base supports 410b (collectively referred to as base supports 410).

Generally, exterior lateral sides of the foundation panel 408 are defined by a plurality of exterior walls (e.g., front exterior walls 412a, a recessed exterior wall 412b, side exterior walls 412c, and a rear exterior wall 412d). The space between the front exterior walls 412a, as laterally separated from each other by the recessed exterior wall 412b helps to define the aforementioned recess of the system frame 400, which allows a person to step into the process bay as described above. As shown in FIGS. 5 and 9, a plurality of openings 414 are formed in the rear exterior wall 412d. Although the openings 414 are shown as formed in the rear exterior wall 412d, it will be appreciated that one or more openings 414 may additionally or alternatively be formed in one or more of the aforementioned exterior walls.

The foundation panel 408 can be provided as a sandwich panel formed of a pair of plates (e.g., first foundation plate 416a and a second foundation plate 416b) and a core (e.g., provided as a plurality of stiffeners 416c, as shown in FIG. 9). As shown in FIG. 9, the stiffeners 416c may be perforated (i.e., by openings 418). The size, number and arrangement of openings 418 in the stiffeners 416c may be selected to facilitate air flow in spaces between the first foundation plate 416a and second foundation plate 416b (i.e., within an interior of the foundation panel 408), to facilitate routing of cables or hoses through different regions within the interior of the foundation panel 408, or the like or any combination thereof.

Referring to FIG. 8, one or more openings 800 may be formed in the first foundation plate 416a to thereby place the interior of the foundation panel 408 in fluid communication with a region external to the foundation panel 408. In one embodiment, one or more fans (not shown) may be provided (e.g., each near or within one or more of the openings 800) so as to draw air from outside the foundation panel 408 into the interior thereof. The size, number and arrangement of openings 418 in the stiffeners 416c may also facilitate air flow (e.g., as induced by the one or more fans) such that air flows through the interior of the foundation panel 408 and exits the interior of the foundation panel 408 via the openings 414. The openings 800 are also shown in FIG. 9 to illustrate how they open into the interior of the foundation panel 408.

Figure 7:
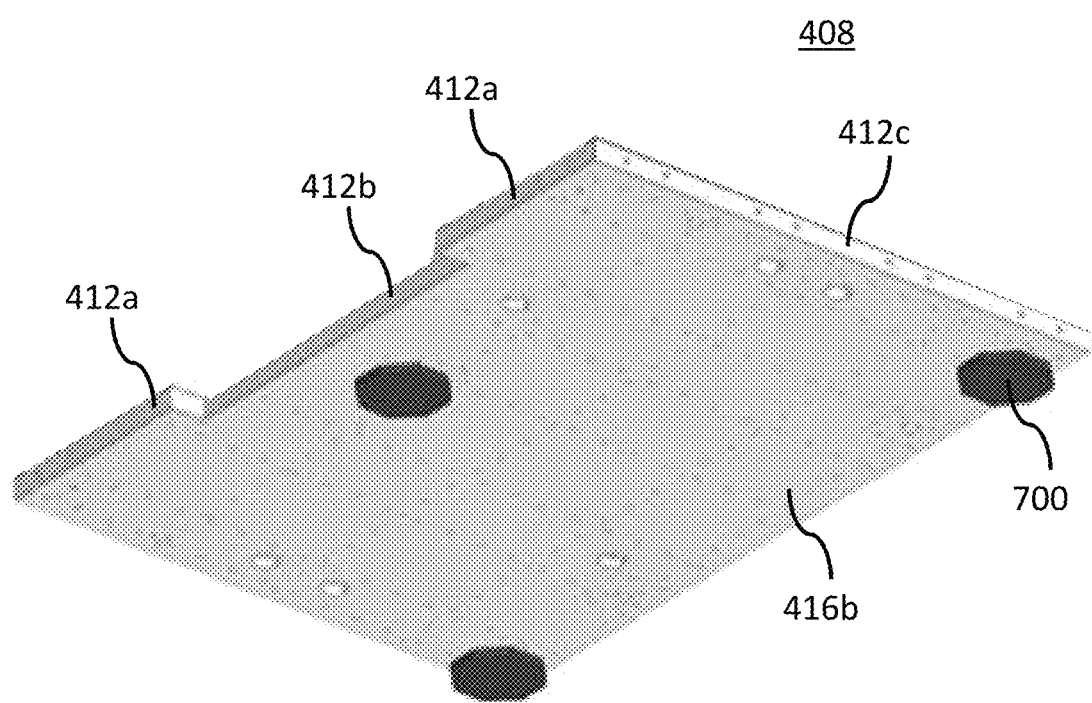
FIG. 7 is a bottom perspective view of the base of the system frame shown in FIGS. 4 and 5, according to an embodiment.

Referring to FIG. 7, the system frame 400 may include a plurality of support pads 700 attached to the second foundation plate 416b of the foundation panel 408. As discussed above, the sandwich panels of the system frame 400 can help to desirably isolate (at least to a suitable or beneficial extent) process components from external or internal vibrations without requiring the use of high-mass bases, gantries or other supports that are conventionally formed as blocks of granite, diabase, concrete, steel, wood or the like. The system frame 400 of the laser processing module 100 can be made sufficiently small, lightweight and stiff so that the laser processing module 100 can be suitably supported (e.g., on a floor or other platform at a manufacturing facility) by only three support pads 700. Accordingly, and assuming that the floor of the manufacturing facility is sufficiently level, the laser processing module 100 will also be level (i.e., assuming that the support pads 700 are of uniform distance from the system frame 400) or can be levelled quickly (e.g., by adjusting only one support pad 700).

Generally, the base supports 410 extend from the foundation panel 408 to the platform 404. The base supports 410 can be fixed to the foundation panel 408 to the platform 404 in any suitable or desired manner (e.g., fixed by welding, adhesive, screw, rivet, clamp, or the like or any combination thereof). One or more regions between the foundation panel 408, the platform 404 and base supports 410 can be used as an electronics bay which, as discussed above, can house one or more controllers, computers, pumps, chillers, fans, and the like.

Figure 6:
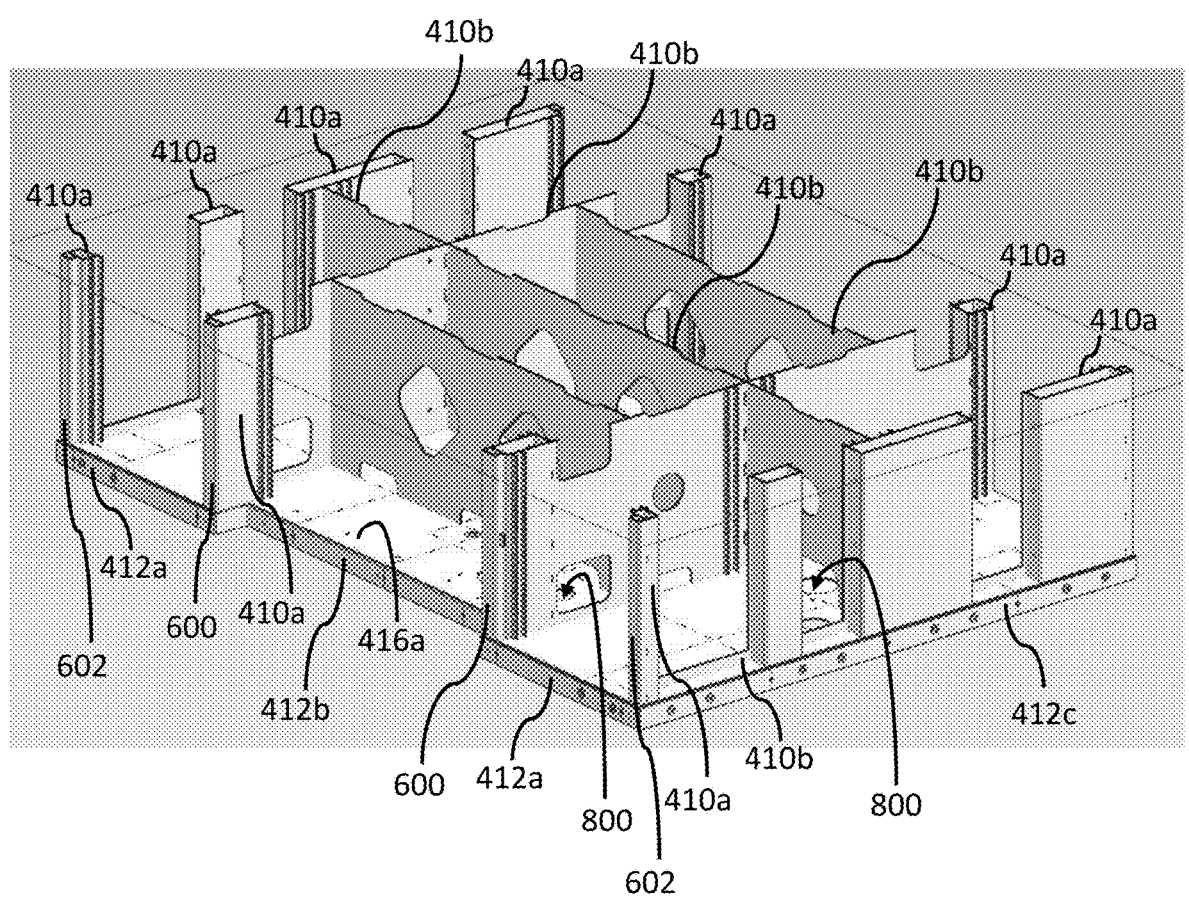
FIG. 6 is a perspective, cross-sectional view of the base of the system frame shown in FIGS. 4 and 5, taken along a plane below the platform of the system frame, illustrating an arrangement of supports according to one embodiment.

Referring to, for example, FIGS. 4 to 6, the base supports 410 can include a plurality of beams 410a and a plurality of plates 410b. The beams 410a may be provided as tubular beams and be arranged along a periphery of the foundation panel 408. The plates 410b may be arranged along the periphery of the foundation panel 408, within a central region of the foundation panel 408 (e.g., as shown). Openings of various sizes and shapes may be formed in the plates 410b to facilitate air flow across different regions between the foundation panel 408 to the platform 404, to facilitate routing of cables or hoses through different regions between the foundation panel 408 to the platform 404, or for any other suitable or desired purpose. Despite the discussion above, it will be appreciated that the number, type and arrangement of base supports 410 in the base 402 can be different from that illustrated in the FIGS., and can be selected as suitable or desired.

As shown in FIG. 6, the base 402 can include a plurality of attachment structures (e.g., posts) attached to some of the base supports (e.g., to some of the beams 410a). Each of the plurality of second door shrouds 106 may be connected to a respective first attachment structure 600. Likewise, each of the plurality of third door shrouds 108 may be connected to a respective second attachment structure 602.

B. Embodiments Relating to the Platform

Figure 10:
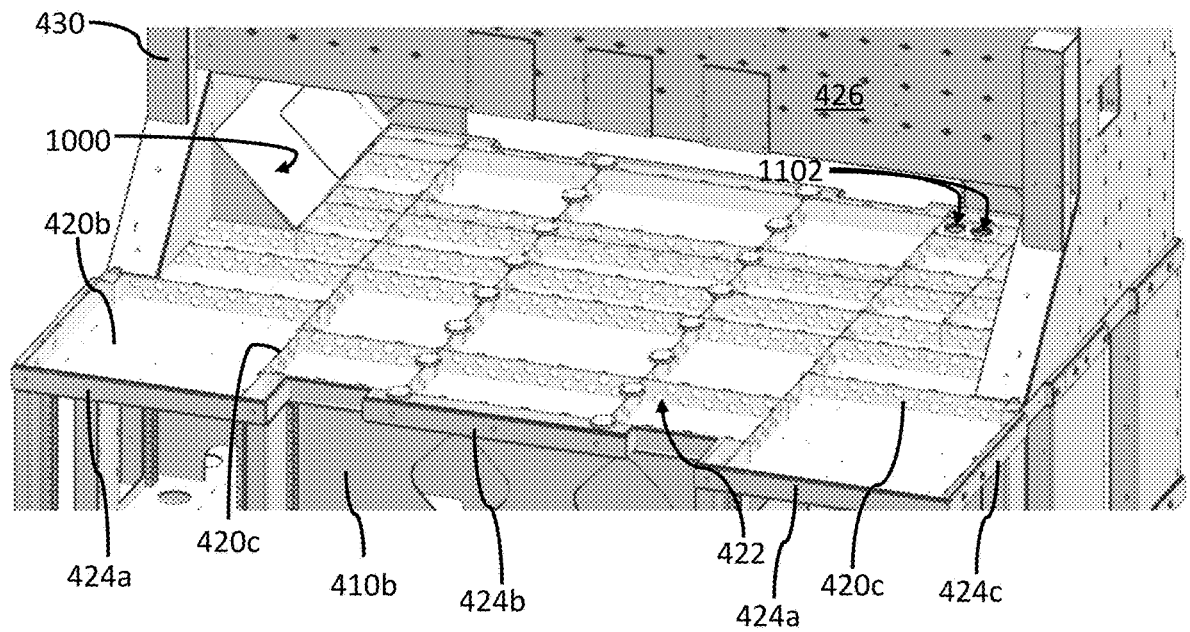
FIG. 10 is an enlarged perspective view of the platform of the system frame shown in FIGS. 4 and 5, in which a view of an exterior plate is omitted to reveal stiffeners therein, according to one embodiment.
Figure 13:
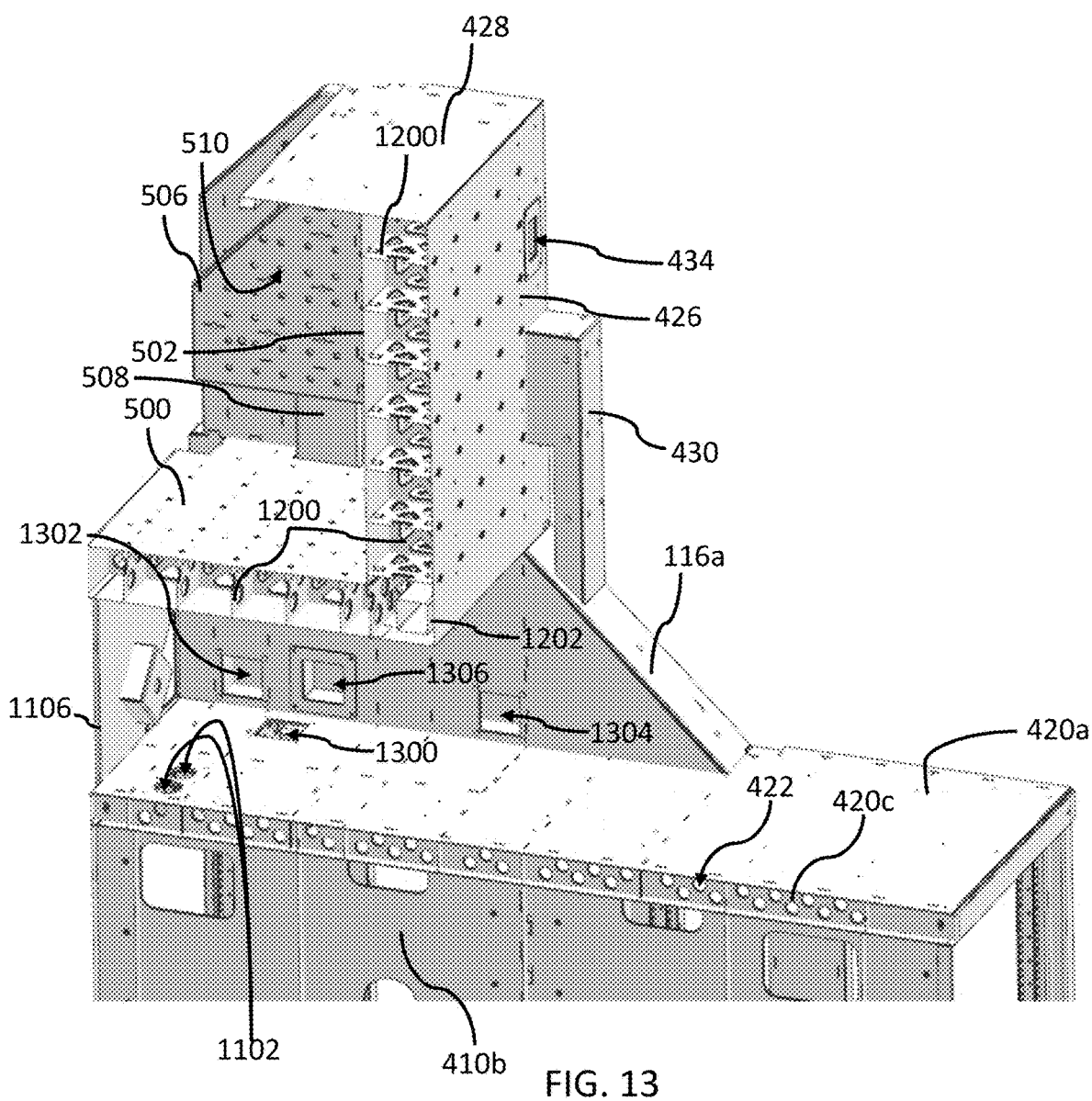
FIGS. 13 and 14 are perspective, cross-sectional views taken along different respective planes intersecting the optics bridge and platform of the system frame shown in FIGS. 4 and 5.
Figure 14:
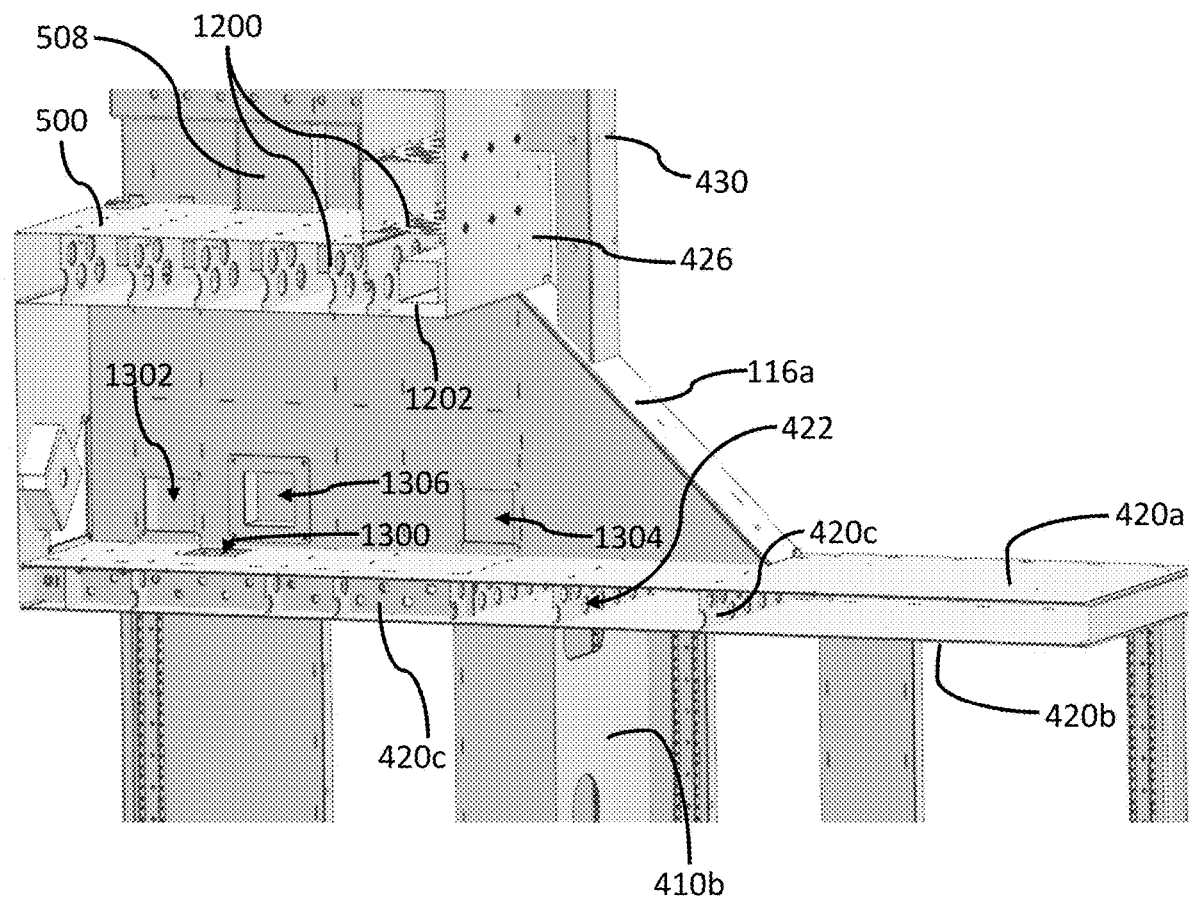

Referring to, for example, FIGS. 4, 5, 10, 11, 13 and 14, the platform 404 can be provided as a sandwich panel formed of a pair of plates (e.g., first platform plate 420a and a second platform plate 420b) and a core (e.g., provided as a plurality of stiffeners 420c, as shown in FIG. 9). As shown in FIGS. 10, 13 and 14, the stiffeners 420c may be perforated (i.e., by openings 422). The size, number and arrangement of openings 422 in the stiffeners 420c may be selected to facilitate air flow in spaces between the first platform plate 420a and second platform plate 420b (i.e., within an interior of the platform 404), to facilitate routing of cables or hoses through different regions within the interior of the platform 404, or the like or any combination thereof. Referring to FIG. 10, the arrangement of stiffeners 420c between the first platform plate 420a and second platform plate 420b, the number, size and arrangement of openings 422 within the stiffeners 420c, or any combination thereof, can be selected or otherwise provided to facilitate beneficial or otherwise suitable air flow throughout at least a majority of the interior of the platform 404.

Generally, exterior lateral sides of the platform 404 are defined by a plurality of exterior walls (e.g., front exterior walls 424a, a recessed exterior wall 424b, side exterior walls 424c, and a rear exterior wall 424d). The space between the front exterior walls 424a, as laterally separated from each other by the recessed exterior wall 424b helps to define the aforementioned recess of the system frame 400, which allows a person to step into the process bay as described above. As shown in FIGS. 5 and 9, a plurality of openings 414 are formed in the rear exterior wall 412d. Although the openings 414 are shown as formed in the rear exterior wall 412d, it will be appreciated that one or more openings 414 may additionally or alternatively be formed in one or more of the aforementioned exterior walls.

Figure 11:
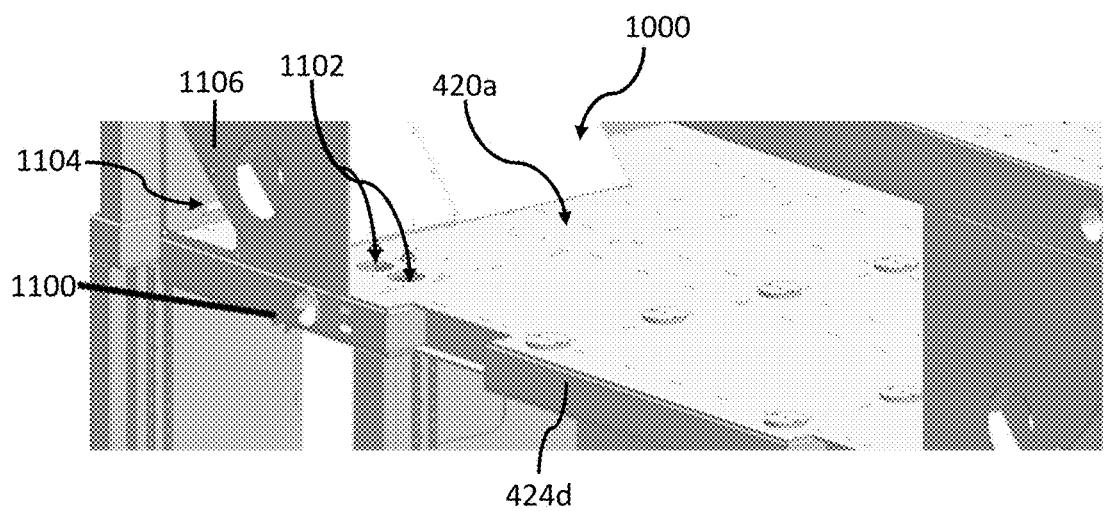
FIG. 11 is an enlarged perspective view of a vacuum connection system integrated into the platform of the system frame shown in FIGS. 4 and 5, according to one embodiment.

Referring to FIG. 11, the platform 404 may also include a chuck connection module (e.g., integrated within the interior of the platform 404). The chuck connection module may include a first connection port 1100 (e.g., formed in the rear exterior wall 424d) and one or more second connection ports 1102 (e.g., formed in the first platform plate 420a). The chuck connection module may define a plenum that is sealed off from the rest of the interior of the platform 404 (e.g., so as to prevent transmission of fluid into the interior of the platform 404 from the plenum), and the first connection port 1100 is in fluid communication with each second connection port 1102 via the plenum. Through the chuck connection module, electrical cables or vacuum hoses may be routed, such that one end of a cable or hose can be suitably connected to a chuck (e.g., chuck 403).

Referring to FIG. 13, one or more openings 1300 (also referred herein as "platform openings") may be formed in the platform 404 (e.g., in the first platform plate 420a, as illustrated, or in the second platform plate 420b, any exterior wall 424a, 424b, 424c or 424d, or any combination thereof) to thereby place the interior of the platform 404 in fluid communication with a region external to the platform 404. As will be described in greater detail below, a fluid (e.g., air, nitrogen, etc.) may be introduced into the interior of the platform 404 through a platform opening 1300, removed from the interior of the platform 404 through a platform opening 1300, or any combination thereof.

C. Embodiments Relating to the Optics Bridge

Referring to, for example, FIGS. 4, 5 and 12 to 14, the optics bridge 406 includes an optics table 500, an optics wall 502 and a process wall 426. The optics bridge 406 may be suspended over the platform 404 by pair of opposing bridge supports 116a and 116b. Generically, the bridge supports 116a and 116b are referred to herein simply as "bridge support 116" or "bridge supports 116." Generally, the optics table 500, optics wall 502 and bridge supports 116 help to define, in cooperation with the optics bay door shroud 110, the aforementioned optics bay. The aforementioned process bay shroud 102 may be attached to the system frame 400 at the optics bridge 406 (e.g., at an upper shelf 428 extending between the optics wall 502 and the process wall 426, at outer surfaces of the bridge supports 116, at front surfaces of buttresses 430, or the like or any combination thereof). Likewise, the optics bay door shroud 110 may be attached to the system frame 400 at the optics bridge 406 (e.g., at the upper shelf 428 of the optics bridge 406).

Generally, the optics table 500, the optics wall 502, or a combination thereof, can support the laser source 120. The optics wall 502 and, optionally, the optics table 500, can support any of the aforementioned optical components 124, any of the aforementioned positioners 122 operative to move the beam of laser energy relative to the workpiece 405, or the like or any combination thereof. Likewise, the process wall 426 can support any of the aforementioned optical components 124, any of the aforementioned positioners 122 operative to move the beam of laser energy relative to the workpiece 405, or the like or any combination thereof. Generally, however, a scan lens (not shown) will be supported by (i.e., mounted to) to the process wall 426 so as to focus an incident beam of laser energy before the beam of laser energy is delivered to the workpiece. Although not shown, a positioner such as a galvo block 122 (e.g., including a pair of orthogonally-rotatable galvanometer mirrors) can also be supported by (i.e., mounted to) to the process wall 426) so as to move an incident beam of laser energy before it propagates to the scan lens, as is known in the art.

The optics bridge 406 further includes one or more optics ports, such as optics ports 432, which extend from the optics wall 502 to the process wall 426, and permit a beam of laser energy to propagate from the optics bay into the process bay (e.g., using one or more mirrors, prisms, or the like, in any manner known to those of ordinary skill in the art).

Figure 12:
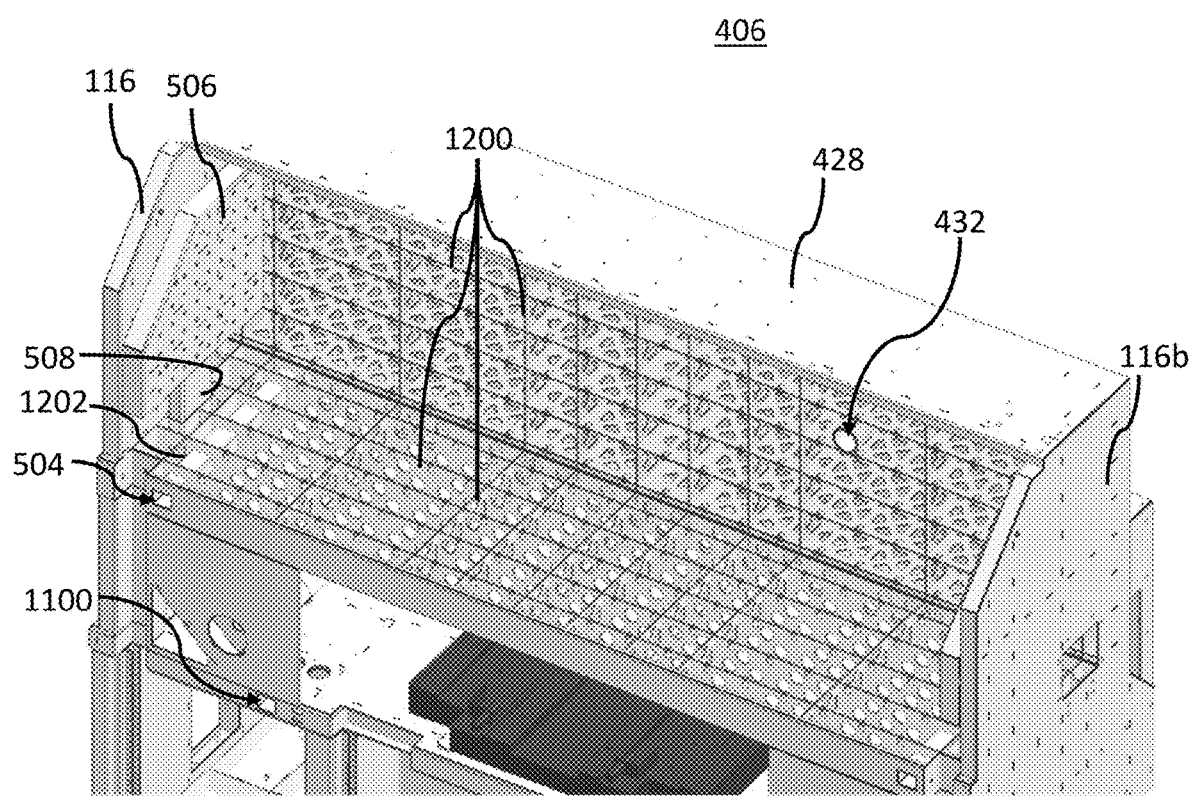
FIG. 12 is a perspective view of the optics bridge of the system frame shown in FIGS. 4 and 5, in which a view of an exterior plate is omitted to reveal stiffeners therein, according to one embodiment.

Referring to, for example, FIGS. 12 to 14, the optics table 500, optics wall 502 and process wall 426 are different surfaces of a common bridge panel, which is provided as a sandwich panel formed of a pair of plates (e.g., first bridge plate and a second bridge plate) and a core (e.g., provided as a plurality of stiffeners 1200). In this case, and as best shown in FIGS. 13 and 14, the first bridge plate can be bent so as to form the optics table 500 and the optics wall 502, and the second bridge plate can be bent so as to form the process wall 426 (e.g., parallel to the optics wall 502) and also extend beneath the optics table 500 (e.g., parallel to the optics table 500). As shown in FIGS. 12 to 14, the stiffeners 1200 may be perforated with openings, the size, number and arrangement of which may be selected to facilitate air flow in spaces between the first bridge plate and second bridge plate (i.e., within an interior of the bridge panel), to facilitate routing of cables or hoses through different regions within the interior of the bridge panel, or the like or any combination thereof.

Figure 15:
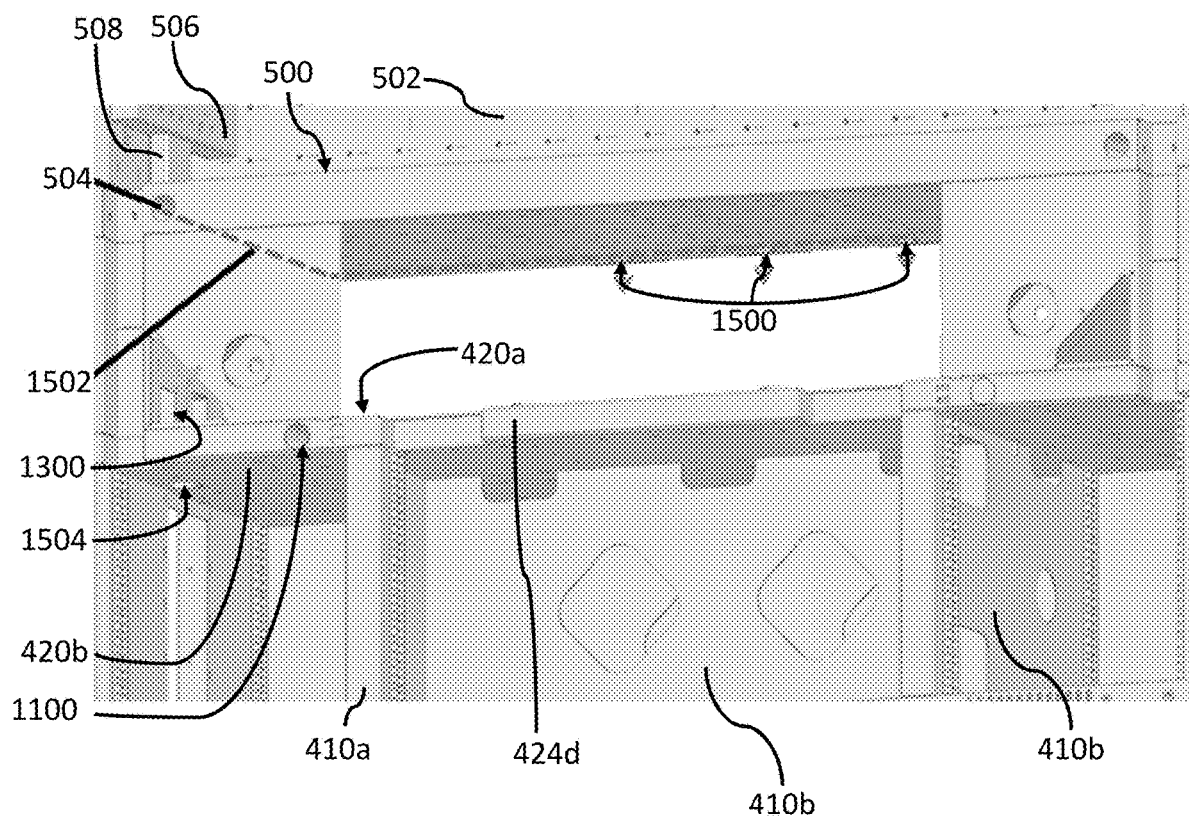
FIG. 15 is an enlarged perspective view of the underside of the optics bridge, with the dashed line delineating a path along which a fluid (e.g., containing one or more gases and any debris generated during processing of a workpiece) can be conveyed.
Figure 16:
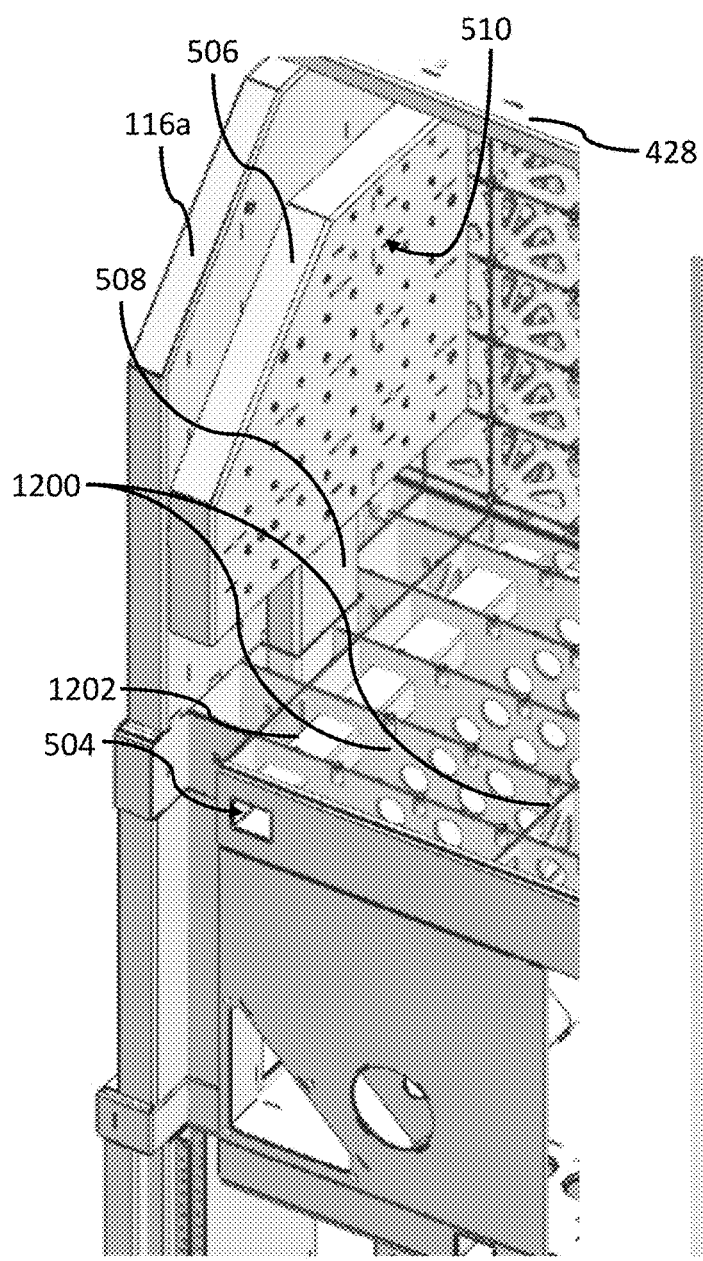
FIG. 16 is an enlarged perspective view of the purge system of the optics bay, as shown in FIG. 12, according to one embodiment.

Referring to, for example, FIGS. 5, 12 to 16, the bridge panel may also include a debris capture tube 1202 (e.g., integrated within the interior of the bridge panel), and may include a first connection port 504 (e.g., formed at a rear of the system frame 400) and one or more second connection ports (e.g., formed in the second bridge plate, as indicated at 1500 in FIG. 15). The debris capture tube 1202 may be sealed off from the rest of the interior of the bridge panel (e.g., so as to prevent transmission of fluid into the interior of the bridge panel from the debris capture tube 1202), and the first connection port 504 is in fluid communication with each second connection port. In FIG. 15, the dashed line 1502 delineates a path within the debris capture tube 1202 along which a fluid (e.g., containing one or more gases and any debris generated during processing of a workpiece) can be conveyed (i.e., from a second connection port 1500 to the first connection port 504). Through the debris capture tube 1202, vacuum hoses may be routed, such that one end of a vacuum hose can be suitably connected to a debris capture nozzle. In another embodiment, the debris capture tube 1202 may, itself, act as a vacuum hose to which a debris capture nozzle can be coupled (i.e., at a second connection port) and a vacuum pump can be connected to the first connection port 504.

In one embodiment, each bridge support 116 may be provided as a sandwich panel formed of a pair of plates indirectly attached to each other by a core interposed between the plates, e.g., in a similar manner as the other sandwich panels discussed above. Stiffeners in the core of each bridge support 116 may thus be perforated with openings, the size, number and arrangement of which may be selected to facilitate air flow in spaces between the plates (i.e., within an interior of the bridge support 116), to facilitate routing of cables or hoses through different regions within the interior of the bridge panel, or the like or any combination thereof.

Referring to, for example, FIGS. 13 and 14, one or more bridge supports 116 may include a table connection tube (not shown) and a wall connection tube (not shown) integrated within an interior thereof. In one embodiment, one or both of the table connection tube and the wall connection tube are sealed off from the interior of the bridge support 116 (e.g., so as to prevent transmission of fluid into the interior of the bridge support 116 from any of the connection tubes). One end of the table connection tube may intersect a plate of a bridge support 116 at a first opening 1302, and another end of the table connection tube may be in fluid communication with an interior of the optics bridge 406 (e.g., via an opening formed in the second bridge plate) at a location beneath the optics table 500. Likewise, one end of the wall connection tube may intersect a plate of a bridge support 116 at a second opening 1304, and another end of the table connection tube may be in fluid communication with an interior of the optics bridge 406 at a location between the optics wall 502 and the process wall 426. As will be described in greater detail below, a fluid (e.g., air, nitrogen, etc.) may be introduced into (or removed from) the interior of the optics bridge 406 through the table opening 1302, the wall opening 1304, or any combination thereof.

Referring to, for example, FIGS. 5 and 13 to 17, the optics bridge 406 may further include a purge system configured to introduce a fluid into the optics bay. Fluid (e.g., a gas such as air) may be introduced into the optics bay for one or more reasons, such as to prevent or minimize the settling of particulates within the optics bay onto optical surfaces of optical components within the optics bay, to pressurize the optics bay (e.g., relative to the process bay, relative to the environment external to the laser processing module 100, or the like or any combination thereof), or the like or any combination thereof.

The purge system may include one or more purge assemblies, each of which includes a purge head 506 and a purge connection tube 508. The purge connection tube 508 may include a first end coupled to the purge head 506 and a second end (e.g., intersecting a plate of a bridge support 116 at a third opening 1306, as exemplarily shown in FIGS. 13 and 14). Generally, the purge head 506 defines an internal plenum and includes a plurality of purge holes 510 in fluid communication with the purge connection tube 508 via the internal plenum. In one embodiment, the purge connection tube 508 is sealed off from the interior of the bridge panel (e.g., so as to prevent transmission of fluid into the interior of the bridge panel from the purge connection tube 508). As will be described in greater detail below, a fluid (e.g., air, nitrogen, etc.) may be introduced into the optics bay through the purge holes 510.

Referring to FIG. 4, the purge system can, optionally, be configured so as to convey fluid from purge head 506 or the purge connection tube 508 into the process bay (e.g., via a process bay purge opening 434). For example, a process bay purge tube (not shown) can extend from the purge head 506, though the bridge panel, and open into the process bay. The process bay purge tube may be sealed off from the rest of the interior of the bridge panel (e.g., so as to prevent transmission of fluid into the interior of the bridge panel from the process bay purge tube).

Figure 17:
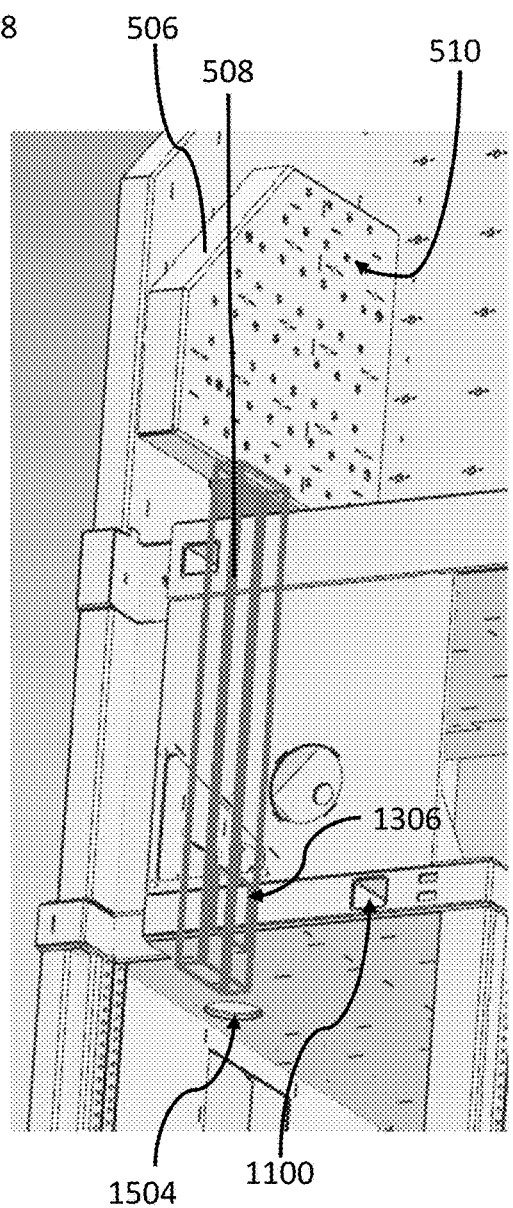
FIG. 17 is a perspective view of the purge system shown in FIGS. 12 and 16, and highlights a conduit fluidly connecting the purge system to an inlet formed in a wall of the system frame shown in FIGS. 4 and 5, according to one embodiment.

Referring to FIGS. 15 and 17, the purge system can, optionally, be configured so as to convey fluid from purge head 506 or the purge connection tube 508 into an electronics bay (e.g., via an electronics bay purge opening 1504). For example, an electronics bay purge tube (not shown) can extend from the purge connection tube 508, though the platform 404, and open into an electronics bay. The electronics bay purge tube may be sealed off from the rest of the interior of the platform 404 (e.g., so as to prevent transmission of fluid into the interior of the platform 404 from the electronics bay purge tube).

IV. EMBODIMENTS RELATING TO FLUID

Any "fluid" referred to above can be warmer than or cooler than, or be the same temperature as, the temperature in the ambient environment (i.e., the environment surrounding the laser processing module 100). In one embodiment, the fluid introduced into the interior of the platform 404, the interior of the bridge panel of the optics bridge 406, into the optics bay, or the like or any combination thereof, may contain less particulate matter than is present in the air of the ambient environment (i.e., in the "ambient air"), or may contain the same or more particulate matter than is present in the ambient air.

In one embodiment, a fluid (e.g., air, nitrogen, etc.) may be introduced into the interior of the platform 404 through a platform opening 1300 formed in the platform 404 (e.g., in the first platform plate 420a) at a location near one of the bridge supports 116 (e.g., bridge support 116a), and the fluid may be removed from the platform 404 through a platform opening 1300 formed in the platform 404 (e.g., in the first platform plate 420a) at a location near the other of the bridge supports 116 (e.g., bridge support 116b).

In one embodiment, a fluid (e.g., air, nitrogen, etc.) may be introduced into the interior of the bridge panel through a table opening 1302 and wall opening 1304 both commonly formed in one of the bridge supports 116 (e.g., bridge support 116a), and the fluid may be removed from the optics bridge 406 through a table opening 1302 and wall opening 1304 both commonly formed in another of the bridge supports 116 (e.g., bridge support 116b).

As discussed above, fluid is introduced into (or removed from) the interiors of the platform 404 and bridge panel of the optics bridge 406 through openings formed in the same bridge support 116, and fluid is removed from the interiors of the platform 404 and bridge panel of the optics bridge 406 through openings formed in the same bridge support 116. In this case, each of the openings 1300, 1302 and 1304 can be individually connected to different hoses for introducing fluid into, or removing fluid from, the system frame 400 as discussed above. In another embodiment, the system frame 400 may include a shell, such as shell 1000 as shown in FIG. 10, which is sealed to a bridge support 116 and the platform 404 so as to prevent fluid from leaking directly from the interior of the shell 1000 to the area outside the shell 1000. The aforementioned openings 1300, 1302, 1304 and 1306 may all be exposed to an interior of the shell 1000, and thus receive fluid introduced into the interior of the shell 1000. The fluid may be introduced into the interior of the shell 1000 in any suitable or desired manner (e.g., through an opening 1104 formed in plate 1106, which is also sealed to the shell 1000 and a bridge support 116, as exemplarily illustrated in FIG. 11). In another, optional, embodiment, fluid may be separately introduced into a purge assembly through the third opening 1306 (e.g., by inserting a purge hose (not shown) into the interior of the shell 1000 through the opening 1104 and connecting the purge hose directly to the third opening 1306).

V. EMBODIMENTS RELATING VISUAL SIGNALING

Conventionally, laser processing systems often include one or more mechanisms to visually convey information (e.g., to an operator of the laser processing system, to a technician, etc.) relating to the functional status of the system. Examples of such mechanisms include visual display screens (e.g., computer monitors), beacon tower lights (e.g., such as the TL50BL Beacon Tower Light, as manufactured by BANNER ENGINEERING CORP.) or other exterior lights (e.g., as with the PLATELASER 1530 metal cutting machine, manufactured by PIRANHA-WHITNEY). Such mechanisms, however, are generally limited in the amount of information they can effectively convey and (in the case of mechanisms such as display screens, beacon tower lights or other exterior lights) are difficult to discern from a distance. Moreover, mechanisms such as beacon tower lights are often limited in the number of light emitting elements included, and color that each light emitting element is capable of generating when activated. Accordingly, users of beacon tower lights can try to increase the amount of information that can be conveyed by encoding the information as a combination of lights emitting elements that are activated, as a sequence in which the light emitting elements are activated, or as a rate with which a light emitting element is intermittently activated (i.e., so as to flash or blink the light emitting element). Thus as the information to be visually conveyed by a beacon tower light increases, it becomes more difficult for an observer to quickly interpret the visual signals that are ultimately output. This problem can be made worse when many laser processing systems—each provided with a beacon tower light—are grouped together on a factory floor.

The DATRON M8CUBE CNC milling machine, manufactured by DAYTRON DYNAMICS, INC., is understood to incorporate a three-color LED indirect-lighting system into a gantry supporting a mechanical bit, where the three-color LED indirect-lighting system is operative to indicate the status of the machine. While the three-color LED indirect-lighting system can obviate the need for an externally-mounted beacon light tower, the indirect-lighting system incorporated into the gantry system remains visually small, and difficult to discern from a distance.

Another mechanism, employed in the DWX-4 W Wet Dental Milling Machine manufactured by ROLAND DG CORPORATION, illuminates the interior of a windowed enclosure (i.e., within which a workpiece is to be mechanically milled) with a different color depending upon the status of the milling machine. In the DWX-4 W Wet Dental Milling Machine, a lit blue light indicates that the machine is in "standby," and all light will turn off if no operation begins within five minutes. A lit white light indicates a pause in milling operation and a lit yellow light indicates that an error has occurred and the machine has been paused. A lit red light indicates that an error has caused milling to stop, requiring user intervention. A flashing red light indicates that the user should restart the machine. While the status illumination system of the DWX-4 W Wet Dental Milling Machine is easier to discern from a distance than other of the visual status indication systems discussed above, the amount of information that it can effectively convey remains relatively limited.

To overcome the problems associated with the aforementioned conventional mechanisms for conveying information, such as those described above, the laser processing module 100 can include a visual signaling system configured to emit light (also referred to herein as a "signal light") into the process bay such that the signal light is visible (e.g., through the window 114) from outside the laser processing module 100. As will be discussed in greater detail below, the visual signaling system can be used to convey information by selecting or otherwise varying one or more characteristics of the signal light. Exemplary characteristics of the signal light include color, brightness, and persistence (i.e., whether the signal light is non-flashing or flashing, and, if flashing, the duration of each flash, and the rate at which the light is flashed).

The visual signaling system can be composed of one or more lighting elements (e.g., one or more LEDs, OLEDSs, QD LEDs, or the like or any combination thereof), each arranged and configured to illuminate one or more objects within the process bay with signal light. Optionally, the visual signaling system may include one or more light guides, diffusers, or the like or any combination thereof, to spread or rout light emitted by the one or more light emitting elements 650 to any desired location, as is known in the art.

To facilitate visibility of the signal light from outside the laser processing module through the window 114, one or more surfaces exposed to the processing bay (e.g., an interior surface of the first shroud 102, a surface of the process wall 426, a surface of the first platform plate 420*a*, or the like or any combination thereof), can be configured to reflect (e.g., in a relatively diffuse manner) signal light emitted by the one or more lighting elements. For example, one or more of the aforementioned surfaces can be painted white or other light color, or coated with a reflective layer, foil or film.

The operation of the visual signaling system can be controlled (e.g., by a controller, computer 105 (shown in FIG. 3), or the like, arranged within an electronics bay) to vary one or more characteristics (e.g., color, brightness, persistence, etc.) of the signal light depending upon the functional status (e.g., "idle," "running," "operation paused," "operation error," "maintenance due," or the like) of the laser processing module 100 (or the laser processing system, more generally), the type of workpiece (e.g., FPC laminate "A," FPC laminate "B," PCB panel "A," PCB panel "B," etc.) to be processed within the laser processing module 100, the pattern of features (e.g., feature pattern "A," feature pattern "B," etc.) to be formed in or on the workpiece during processing, the status of a production run (i.e., where "production run" refers to the number of workpieces to be processed), the throughput of the laser processing module 100 (or the laser processing system, more generally), the cycle time (i.e., where "cycle time" refers to the total elapsed time to process a single workpiece) during processing of a workpiece, the takt time (i.e., where "takt time" refers to the total elapsed time between the completion of processing of one workpiece and the beginning of processing a different workpiece), or the like or any combination thereof.

Generally, at least one characteristic of the signal light associated with a functional status of the laser processing module 100 (or the laser processing system, more generally) is different from a corresponding characteristic of the signal light associated with a different functional status of the laser processing module 100 (or the laser processing system, more generally). At least one characteristic (e.g., color, etc.) of signal light associated with the type of workpiece or pattern of features to be formed in the workpiece may be same as or different from a corresponding characteristic of the signal light associated with one or more functional statuses of the laser processing module 100 (or the laser processing system, more generally). For example, a functional status of "idle" may be represented by a non-flashing signal light having a yellow color, a functional status of "operation paused" may be represented by a flashing signal light having a first color (e.g., yellow), a functional status of "operation error" may be represented by a signal light having a second color (e.g., red), a functional status of "maintenance due" may be represented by a signal light having a third color (e.g., orange), etc. A functional status of "running" may be represented by a non-flashing signal light having a fourth color (e.g., blue, purple, pink, cyan, magenta, etc.) that is also associated with the type of workpiece currently being processed or pattern of features currently being formed in the workpiece.

A characteristic (e.g., color) of signal light associated with the cycle time during processing of a workpiece may be the same as a corresponding characteristic of the signal light associated with the type of workpiece processed (or pattern of features to be formed in the workpiece during processing). However, at least one other characteristic (e.g., intensity, persistence, etc.) of signal light associated with the cycle time during processing of the workpiece may be different from a corresponding characteristic of the signal light associated with the type of workpiece processed (or pattern of features to be formed in a workpiece during a processing). For example, signal light associated with the type of workpiece processed (or pattern of features to be formed in a workpiece during processing) and with the type of workpiece processed in the production run (or pattern of features to be formed in a workpiece during a production run) may be non-flashing and green in color, but the signal light may increase or decrease in intensity (i.e., get brighter or dimmer) and/or may start to flash (e.g., at a constant or increasing rate) as time progresses to qualitatively convey that workpiece processing is about to end or has ended. Alternatively, the color of signal light associated with the cycle time during processing of a workpiece may be different from the color characteristic of the signal light associated with the type of workpiece processed (or pattern of features to be formed in the workpiece during processing).

A characteristic (e.g., color) of signal light associated with the status of a production run may be the same as a corresponding characteristic of the signal light associated with the type of workpiece to be processed in the production run (or pattern of features to be formed in a workpiece during the production run). However, at least one other characteristic (e.g., intensity, persistence, etc.) of signal light associated with the status of the production run may be different from a corresponding characteristic of the signal light associated with the type of workpiece to be processed in the production run (or pattern of features to be formed in a workpiece during the production run). For example, signal light associated with the type of workpiece processed in the production run (or pattern of features to be formed in a workpiece during a production run) and with the type of workpiece processed in the production run (or pattern of features to be formed in a workpiece during a production run) may be non-flashing and green in color, but the signal light may increase or decrease in intensity (i.e., get brighter or dimmer) and/or may start to flash (e.g., at a constant or increasing rate) as time progresses to qualitatively convey that the production run is about to end or has ended. Alternatively, the color of signal light associated with status of a production run may be different from the color characteristic of the signal light associated with the type of workpiece processed in the production run (or pattern of features to be formed in the workpiece during the production run). Optionally, a characteristic (e.g., intensity, persistence, etc.) of signal light associated with the status of the production run may be different from a corresponding characteristic of signal light associated with the cycle time for processing workpieces in the production run.

A characteristic (e.g., color) of signal light associated with the takt time may be the same as a corresponding characteristic of the signal light associated with a functional status (e.g., idle, operation paused, operation error, etc.). However, at least one other characteristic (e.g., intensity, persistence, etc.) of signal light associated with the takt time may be different from a corresponding characteristic of the signal light associated with the functional status (e.g., idle, operation paused, operation error, etc.). For example, signal light associated with the takt time and with a functional status (e.g., idle) may be non-flashing and yellow in color, but the signal light may increase or decrease in intensity (i.e., get brighter or dimmer) and/or may start to flash (e.g., at a constant or increasing rate) as time progresses to qualitatively convey that a predetermined threshold amount of time has elapsed while the laser processing module 100 (or the laser processing system has been idle.

Although the examples and embodiments above have described the visual signaling system as an alternative to conventional information-conveying mechanisms such as beacon tower lights and display screens, it will be appreciated that the visual signaling system can be used in conjunction with such conventional information-conveying mechanisms.

Although the operation of the visual signaling system has been described as controllable depending upon the functional status of the laser processing module 100, the type of workpiece to be processed within the laser processing module 100, the pattern of features to be formed in or on the workpiece during processing, the status of a production run, the throughput of the laser processing module 100 (or the laser processing system, more generally), the cycle time during processing of a workpiece and the takt time, it will be appreciated that the visual signal system can be controlled in any other suitable or desired manner. For example, the visual signaling system can be controlled in response to user instructions (e.g., via one or more user-interface components).

VI. CONCLUSION

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A laser processing module for processing a workpiece, the module comprising:
    a frame comprising:
        a platform having an upper surface and a lower surface;
        an optics bridge spaced apart from, and extending over, the upper surface of the platform; and
        a bridge support interposed between, and coupled to, the platform and the optics bridge,
        wherein at least one selected from the group consisting of the platform and the optics bridge includes a sandwich panel, wherein the sandwich panel includes:
            a first plate;
            a second plate;
            a core interposed between, and attached to, the first plate and the second plate, wherein the first plate and the second plate are indirectly attached to one another by the core and wherein the core defines at least one channel extending between the first plate and the second plate;
    a first port formed at an exterior of the sandwich panel and in fluid communication with the at least one channel; and
    a second port formed at the exterior of the sandwich panel and in fluid communication with the at least one channel; and
    a laser source supported by the optics bridge and operative to generate a beam of laser energy,
    wherein the workpiece is supportable on the platform.

2. The module of claim 1, wherein the core includes a tube.

3. The module of claim 1, wherein the core includes a plate.

4. The module of claim 3, wherein the plate is perforated to facilitate air flow within an interior of the sandwich panel between the first plate and the second plate.

5. The module of claim 1, further comprising a tube arranged within the at least one channel and extending from the first port to the second port such that an interior of the tube is not in fluid communication with the at least one channel of the sandwich panel.

6. The module of claim 5, wherein the platform includes a sandwich panel and wherein the sandwich panel further includes an exterior wall extending from the first plate to the second plate,
    wherein the first port is located in the first plate and the second port is located in the exterior wall.

7. The module of claim 5,
    wherein the optics bridge includes an optics table and an optics wall, wherein a surface defined by the optics table is not parallel to a surface defined by the optics wall,
    the optics bridge includes a sandwich panel, wherein the sandwich panel of the optics bridge further includes an exterior wall extending from the first plate to the second plate, and
    the first port is located in the first plate and the second port is located in the exterior wall.

8. The module of claim 7, wherein the optics table is formed from the second plate.

9. The module of claim 8, wherein the optics wall is formed from the second plate.

10. The module of claim 7, further comprising:
    a positioner operative to move the beam of laser energy relative to the workpiece, wherein the positioner supported by the optics wall of the optics bridge.

11. The module of claim 7, wherein the optics bridge further comprises a process wall opposite the optics wall, the module further comprising:
    at least one optical component supported by the process wall.

12. The module of claim 11, further comprising:
    a shroud attached to the optics bridge and the platform;
    a first door shroud attached to the shroud; and
    a plurality of second door shrouds aligned to the first door shroud and attached to the frame at a location below the platform,
    wherein the shroud, the first door shroud, the optics bridge and the platform define a process bay within which the workpiece can be supported during processing,
    wherein the first door shroud and the plurality of second door shrouds can be opened and closed, and
    wherein, when the first door shroud and the plurality of second door shrouds are opened, the at least one optical component is accessible to a user.

13. The module of claim 1, wherein the optics bridge includes a sandwich panel, the frame further comprising:
    a tube external to the optics bridge, wherein an interior of the tube is in fluid communication with the at least one channel of the sandwich panel of the optics bridge.

14. The module of claim 13, wherein the tube is integrated within the bridge support.

15. The module of claim 1, further comprising a purge system having at least one purge outlet, wherein the purge system includes at least one purge tube operative to convey fluid to the at least one purge outlet.

16. The module of claim 15, wherein the at least one purge tube is integrated within the bridge support.

17. The module of claim 15, wherein the at least one purge tube extends through the optics bridge.

18. The module of claim 17, wherein
    the optics bridge includes an optics table and an optics wall,
    wherein a surface defined by the optics table is not parallel to a surface defined by the optics wall, and
    wherein the at least one purge tube extends through at least one selected from the group consisting of the optics table and the optics wall.

19. The module of claim 1, wherein the frame does not include any material selected from the group consisting of granite, diabase, and concrete.

20. The module of claim 1, wherein the laser is a carbon dioxide laser.

21. The module of claim 20, wherein the carbon dioxide laser is operative to generate a laser beam having an average power of 200 W or greater.

22. The module of claim 21, further comprising:
a door shroud attached to the optics bridge; and
wherein the door shroud and the optics bridge partially define an optics bay within which the laser source can be supported,
wherein the door shroud can be opened and closed, and
wherein, when the door shroud is opened and the frame is supported on a surface, the laser source is accessible to a user standing on the surface.

23. The module of claim 1, wherein the laser is an ultraviolet laser.

24. The module of claim 1, wherein the frame is supported on an exterior surface by no more than three support pads.

25. The module of claim 1, wherein the laser is to generate a laser beam configured to process the workpiece, the module further comprising:
a chuck supported by the frame, the chuck configured to support the workpiece within a process bay;
a visual signaling system including at least one light emitting element operative to emit light, wherein the visual signaling system is operative to illuminate at least one object exposed to the process bay with the light; and
a computer communicatively coupled to the visual signaling system, wherein the computer is operative to control the visual signaling system to change at least one characteristic of the light depending upon at least one selected from the group consisting of a functional status of the laser processing module, the type of workpiece to be processed within the laser processing module, a pattern of features to be formed in or on the workpiece during processing, a status of a production run, a throughput of the laser processing module, a cycle time during processing of a workpiece and a takt time.

* * * * *